US012565450B2

(12) United States Patent
Khan

(10) Patent No.: US 12,565,450 B2
(45) Date of Patent: Mar. 3, 2026

(54) OXIDATION PROTECTION FOR CARBON-CARBON COMPOSITES

(71) Applicant: GOODRICH CORPORATION, Charlotte, NC (US)

(72) Inventor: Atta Khan, Riverside, CA (US)

(73) Assignee: GOODRICH CORPORATION, Charlotte, NC (US)

( * ) Notice: Subject to any disclaimer, the term of this patent is extended or adjusted under 35 U.S.C. 154(b) by 831 days.

(21) Appl. No.: 17/843,715

(22) Filed: Jun. 17, 2022

(65) Prior Publication Data

US 2023/0406778 A1     Dec. 21, 2023

(51) Int. Cl.
| | |
|---|---|
| *B32B 15/04* | (2006.01) |
| *B32B 17/06* | (2006.01) |
| *C04B 35/565* | (2006.01) |
| *C04B 35/622* | (2006.01) |
| *C04B 41/50* | (2006.01) |

(52) U.S. Cl.
CPC ...... *C04B 35/62222* (2013.01); *C04B 35/565* (2013.01); *C04B 41/5022* (2013.01); *C04B 2235/3826* (2013.01); *C04B 2235/402* (2013.01); *C04B 2235/963* (2013.01); *C04B 2235/9684* (2013.01)

(58) Field of Classification Search
CPC ................................................. C04B 41/5059
USPC ................................................. 428/698, 699
See application file for complete search history.

(56) References Cited

U.S. PATENT DOCUMENTS

| | | | |
|---|---|---|---|
| 1,892,790 | A | 1/1933 | Smelser |
| 2,685,539 | A | 8/1954 | Woodburn, Jr. et al. |
| 2,685,540 | A | 8/1954 | Woodburn, Jr. et al. |
| 2,685,541 | A | 8/1954 | Woodburn, Jr. et al. |
| 2,685,542 | A | 8/1954 | Woodburn, Jr. et al. |
| 2,989,153 | A | 6/1961 | Boulet et al. |
| 3,342,627 | A | 9/1967 | Paxton et al. |
| 3,510,347 | A | 5/1970 | Strater |
| 3,692,150 | A | 9/1972 | Ruppe, Jr. |
| 3,713,882 | A | 1/1973 | DeBrunner et al. |
| 3,794,509 | A | 2/1974 | Trauger et al. |
| 3,972,395 | A | 8/1976 | Jannasch et al. |
| 4,290,510 | A | 9/1981 | Warren |

(Continued)

FOREIGN PATENT DOCUMENTS

| | | |
|---|---|---|
| CN | 1046517 | 10/1990 |
| CN | 101233341 | 7/2008 |

(Continued)

OTHER PUBLICATIONS

USPTO; Non-Final Office Action dated Nov. 18, 2024 in U.S. Appl. No. 17/671,361.

(Continued)

*Primary Examiner* — Lauren R Colgan
(74) *Attorney, Agent, or Firm* — SNELL & WILMER L.L.P.

(57)     ABSTRACT

A method for forming an oxidation protection system on a composite structure may comprise applying a ceramic layer slurry to the composite structure and heating the composite structure to form a ceramic layer on the composite structure. The ceramic layer slurry may comprise aluminum and silicon carbide powder in a sol. The ceramic layer may comprise alumina, silicon carbide and silicon oxycarbide.

5 Claims, 8 Drawing Sheets

(56)         References Cited

U.S. PATENT DOCUMENTS

| | | |
|---|---|---|
| 4,330,572 A | 5/1982 | Frosch et al. |
| 4,332,856 A | 6/1982 | Hsu |
| 4,425,407 A | 1/1984 | Galasso et al. |
| 4,439,491 A | 3/1984 | Wilson |
| 4,454,193 A | 6/1984 | Block |
| 4,471,023 A | 9/1984 | Shuford |
| 4,500,602 A | 2/1985 | Patten et al. |
| 4,548,957 A | 10/1985 | Hucke |
| 4,567,103 A | 1/1986 | Sara |
| 4,599,256 A | 7/1986 | Vasilos |
| 4,617,232 A | 10/1986 | Chandler et al. |
| 4,621,017 A | 11/1986 | Chandler et al. |
| 4,663,060 A | 5/1987 | Holinski |
| 4,702,960 A | 10/1987 | Ogman |
| 4,711,666 A | 12/1987 | Chapman et al. |
| 4,726,995 A | 2/1988 | Chiu |
| 4,760,900 A | 8/1988 | Shima et al. |
| 4,808,558 A | 2/1989 | Park et al. |
| 4,837,073 A | 6/1989 | McAllister et al. |
| 4,863,001 A | 9/1989 | Edmisten |
| 4,958,998 A | 9/1990 | Yamauchi et al. |
| 4,960,817 A | 10/1990 | Spadafora |
| 5,073,454 A | 12/1991 | Graham |
| 5,077,130 A | 12/1991 | Okuyama et al. |
| 5,094,901 A | 3/1992 | Gray |
| 5,102,698 A | 4/1992 | Cavalier et al. |
| 5,153,070 A | 10/1992 | Andrus et al. |
| 5,179,048 A | 1/1993 | Niebylski et al. |
| 5,198,152 A | 3/1993 | Liimatta et al. |
| 5,215,563 A | 6/1993 | LaCourse et al. |
| 5,224,572 A | 7/1993 | Smolen et al. |
| 5,242,746 A | 9/1993 | Bommier et al. |
| 5,256,448 A | 10/1993 | De Castro |
| 5,273,819 A | 12/1993 | Jex |
| 5,298,311 A | 3/1994 | Bentson et al. |
| 5,324,541 A | 6/1994 | Shuford |
| 5,352,494 A | 10/1994 | Rousseau |
| 5,360,638 A | 11/1994 | Lequertier |
| 5,401,440 A | 3/1995 | Stover et al. |
| 5,420,085 A | 5/1995 | Newkirk |
| 5,427,823 A | 6/1995 | Varshney et al. |
| 5,439,080 A | 8/1995 | Haneda et al. |
| 5,480,676 A | 1/1996 | Sonuparlak et al. |
| 5,501,306 A | 3/1996 | Martino |
| 5,518,683 A | 5/1996 | Taylor et al. |
| 5,518,816 A | 5/1996 | Shuford |
| 5,536,574 A | 7/1996 | Carter |
| 5,622,751 A | 4/1997 | Thebault et al. |
| 5,629,101 A | 5/1997 | Watremez |
| 5,643,663 A | 7/1997 | Bommier et al. |
| 5,682,596 A | 10/1997 | Taylor et al. |
| 5,686,144 A | 11/1997 | Thebault et al. |
| 5,714,244 A | 2/1998 | Delaval et al. |
| 5,725,955 A | 3/1998 | Tawil et al. |
| 5,759,622 A | 6/1998 | Stover |
| 5,856,015 A | 1/1999 | Buchanan |
| 5,871,820 A | 2/1999 | Hasz et al. |
| 5,878,843 A | 3/1999 | Saum |
| 5,878,849 A | 3/1999 | Prunier, Jr. et al. |
| 5,901,818 A | 5/1999 | Martino |
| 5,958,846 A | 9/1999 | Geriner |
| 5,965,266 A | 10/1999 | Goujard et al. |
| 5,971,113 A | 10/1999 | Kesavan et al. |
| 5,981,072 A | 11/1999 | Mercuri et al. |
| 6,016,450 A | 1/2000 | Corck |
| 6,036,762 A | 3/2000 | Sambasivan |
| 6,071,603 A | 6/2000 | Sakai et al. |
| 6,071,615 A | 6/2000 | Solow et al. |
| 6,225,248 B1 | 5/2001 | Leiser et al. |
| 6,228,453 B1 | 5/2001 | Fareed et al. |
| 6,256,187 B1 | 7/2001 | Matsunaga et al. |
| 6,346,331 B2 | 2/2002 | Harvey et al. |
| 6,460,374 B2 | 10/2002 | Sakai et al. |
| 6,461,415 B1 | 10/2002 | Sambasivan et al. |
| 6,497,307 B1 | 12/2002 | Schoo et al. |
| 6,551,701 B1 | 4/2003 | Nohr et al. |
| 6,551,709 B1* | 4/2003 | Stover ................ C04B 41/5015 |
| | | 428/408 |
| 6,555,173 B1 | 4/2003 | Forsythe et al. |
| 6,632,762 B1 | 10/2003 | Zaykoski et al. |
| 6,668,984 B2 | 12/2003 | Gray |
| 6,676,887 B2* | 1/2004 | Lafdi ..................... C04B 35/83 |
| | | 977/788 |
| 6,737,120 B1 | 5/2004 | Golecki |
| 6,740,408 B2 | 5/2004 | Thebault |
| 6,759,117 B2 | 7/2004 | Bauer et al. |
| 6,884,467 B2 | 4/2005 | Walker et al. |
| 6,896,968 B2 | 5/2005 | Golecki |
| 6,913,821 B2 | 7/2005 | Golecki et al. |
| 6,969,422 B2 | 11/2005 | Mazany et al. |
| 7,011,888 B2 | 3/2006 | Bauer et al. |
| 7,118,805 B2 | 10/2006 | Walker et al. |
| 7,160,618 B2 | 1/2007 | Walker et al. |
| 7,311,944 B2 | 12/2007 | Sambasivan et al. |
| 7,501,181 B2 | 3/2009 | Walker et al. |
| 7,641,941 B2 | 1/2010 | Mazany et al. |
| 7,732,358 B2 | 6/2010 | Mazany et al. |
| 7,785,712 B2 | 8/2010 | Miller et al. |
| 7,938,877 B2 | 5/2011 | Liu et al. |
| 7,968,192 B2 | 6/2011 | Mazany et al. |
| 8,021,474 B2 | 9/2011 | Mazany et al. |
| 8,021,758 B2 | 9/2011 | Sambasivan et al. |
| 8,124,184 B2 | 2/2012 | Sambasivan et al. |
| 8,137,802 B1 | 3/2012 | Loehman et al. |
| 8,322,754 B2 | 12/2012 | Carcagno et al. |
| 8,962,083 B2 | 2/2015 | Murphy |
| 9,126,873 B2 | 9/2015 | Diss et al. |
| 9,388,087 B2 | 7/2016 | Don |
| 9,657,409 B2 | 5/2017 | Sandgren et al. |
| 9,758,678 B2 | 9/2017 | Nicolaus et al. |
| 9,790,133 B2 | 10/2017 | Mazany |
| 10,465,285 B2* | 11/2019 | Mazany ............... C04B 41/009 |
| 10,508,206 B2 | 12/2019 | Poteet |
| 10,526,253 B2 | 1/2020 | Poteet |
| 10,767,059 B2 | 9/2020 | Poteet |
| 10,941,486 B2 | 3/2021 | Mazany |
| 11,001,533 B2 | 5/2021 | Mazany et al. |
| 11,046,619 B2* | 6/2021 | Poteet ................ C04B 41/5059 |
| 11,072,565 B2 | 7/2021 | Weaver et al. |
| 11,091,402 B2 | 8/2021 | Poteet |
| 11,634,213 B2 | 4/2023 | Poteet et al. |
| 12,065,380 B2 | 8/2024 | Khan |
| 12,319,622 B2 | 6/2025 | Poteet |
| 2002/0058576 A1 | 5/2002 | Mazany et al. |
| 2002/0096407 A1* | 7/2002 | Gray ....................... C04B 41/89 |
| | | 188/218 XL |
| 2002/0123592 A1 | 9/2002 | Zhang |
| 2003/0021975 A1 | 1/2003 | Martin |
| 2003/0143436 A1 | 7/2003 | Forsythe et al. |
| 2003/0194574 A1 | 10/2003 | Thebault et al. |
| 2004/0038032 A1 | 2/2004 | Walker et al. |
| 2004/0038043 A1 | 2/2004 | Golecki |
| 2004/0062009 A1 | 4/2004 | Osanai et al. |
| 2004/0076806 A1 | 4/2004 | Miyanaga |
| 2004/0213906 A1 | 10/2004 | Mazany et al. |
| 2005/0022698 A1 | 2/2005 | Mazany et al. |
| 2005/0127146 A1 | 6/2005 | Chaumat et al. |
| 2006/0159909 A1 | 7/2006 | Asian |
| 2006/0163605 A1 | 7/2006 | Miyahara |
| 2007/0026153 A1 | 2/2007 | Nicolaus et al. |
| 2007/0065676 A1* | 3/2007 | Bacalski ................ B32B 18/00 |
| | | 428/688 |
| 2007/0154712 A1 | 7/2007 | Mazany et al. |
| 2008/0058193 A1 | 3/2008 | Drake et al. |
| 2008/0142148 A1 | 6/2008 | Mazany |
| 2008/0311301 A1 | 12/2008 | Diss et al. |
| 2010/0044730 A1 | 2/2010 | Kwon et al. |
| 2010/0266770 A1* | 10/2010 | Mazany .................. C04B 41/52 |
| | | 427/372.2 |
| 2011/0311804 A1 | 12/2011 | Diss |
| 2012/0025434 A1 | 2/2012 | Demey et al. |
| 2013/0022826 A1 | 1/2013 | Kmetz |
| 2014/0196502 A1 | 7/2014 | Masuda |
| 2014/0227511 A1 | 8/2014 | Mazany |

(56) References Cited

U.S. PATENT DOCUMENTS

| | | | |
|---|---|---|---|
| 2014/0349016 A1 | 11/2014 | Don | |
| 2015/0183998 A1 | 7/2015 | Belov et al. | |
| 2015/0291805 A1 | 10/2015 | Nicolaus et al. | |
| 2015/0362029 A1 | 12/2015 | Edwards et al. | |
| 2016/0122231 A1 | 5/2016 | Ishihara | |
| 2016/0280585 A1 | 9/2016 | Mazany | |
| 2016/0280612 A1 | 9/2016 | Mazany | |
| 2017/0036945 A1 | 2/2017 | Ishihara | |
| 2017/0267595 A1 | 9/2017 | Mazany | |
| 2017/0342555 A1 | 11/2017 | Mazany | |
| 2017/0349825 A1 | 12/2017 | Mazany | |
| 2017/0369713 A1 | 12/2017 | Poteet | |
| 2017/0369714 A1 | 12/2017 | Nicolaus et al. | |
| 2018/0044537 A1 | 2/2018 | Poteet et al. | |
| 2019/0055393 A1 | 2/2019 | Tsuji | |
| 2019/0233324 A1 | 8/2019 | Poteet et al. | |
| 2020/0148340 A1 | 5/2020 | Poteet et al. | |
| 2020/0148891 A1 | 5/2020 | Grorud | |
| 2021/0087102 A1 | 3/2021 | Simard et al. | |
| 2021/0094887 A1 | 4/2021 | Poteet et al. | |
| 2021/0198159 A1 | 7/2021 | Poteet et al. | |
| 2022/0356123 A1* | 11/2022 | Khan | C04B 41/5058 |
| 2023/0150884 A1 | 5/2023 | Khan et al. | |
| 2023/0219859 A1 | 7/2023 | Nable et al. | |
| 2023/0257313 A1 | 8/2023 | Nable et al. | |
| 2024/0317635 A1 | 9/2024 | Ding et al. | |
| 2024/0318695 A1 | 9/2024 | Ding et al. | |
| 2024/0391835 A1 | 11/2024 | Khan et al. | |

FOREIGN PATENT DOCUMENTS

| | | |
|---|---|---|
| CN | 101328077 | 12/2008 |
| CN | 101898906 | 12/2010 |
| CN | 102515850 | 6/2012 |
| CN | 101712563 | 9/2012 |
| CN | 103274760 | 9/2013 |
| CN | 105237039 | 1/2016 |
| CN | 105646007 | 4/2018 |
| CN | 107935634 | 4/2018 |
| CN | 107986807 | 10/2020 |
| CN | 113831155 | 12/2021 |
| DE | 69830510 | 3/2006 |
| EP | 200568 | 11/1986 |
| EP | 0677499 | 10/1995 |
| EP | 1043290 | 10/2000 |
| EP | 1693262 | 8/2006 |
| EP | 1834937 | 9/2007 |
| EP | 1840264 | 10/2007 |
| EP | 1968914 | 7/2010 |
| EP | 2684752 | 1/2014 |
| EP | 2767529 | 8/2014 |
| EP | 2774900 | 9/2014 |
| EP | 2930162 | 10/2015 |
| EP | 3072865 | 9/2016 |
| EP | 3072866 | 9/2016 |
| EP | 3222602 | 9/2017 |
| EP | 3255027 | 12/2017 |
| EP | 3282038 | 2/2018 |
| EP | 3184228 | 7/2019 |
| EP | 3590910 | 1/2020 |
| EP | 3530637 | 9/2020 |
| EP | 3702342 | 9/2020 |
| EP | 3842404 | 6/2021 |
| EP | 4086234 | 11/2022 |
| EP | 4227286 | 8/2023 |
| EP | 4279472 | 11/2023 |
| GB | 2468378 | 9/2010 |
| JP | 856105442 | 8/1981 |
| JP | S6011353 A | 1/1985 |
| JP | H0812477 | 1/1996 |
| JP | H 09301786 | 11/1997 |
| JP | 2006036551 | 2/2006 |
| KR | 20050022947 | 3/2005 |
| KR | 20090035732 | 4/2009 |
| WO | WO 9742135 | 11/1997 |

| | | |
|---|---|---|
| WO | WO 0051950 | 9/2000 |
| WO | WO03084899 | 10/2003 |
| WO | WO 2007078419 | 7/2007 |
| WO | WO2010001021 | 1/2010 |
| WO | WO 2014035413 | 3/2014 |
| WO | WO 2015169024 | 11/2015 |

OTHER PUBLICATIONS

USPTO; Non-Final Office Action dated Nov. 7, 2024 in U.S. Appl. No. 17/747,816.

USPTO; Notice of Allowance dated Mar. 3, 2025 in U.S. Appl. No. 17/571,083.

USPTO; Notice of Allowance dated Mar. 7, 2025 in U.S. Appl. No. 17/308,776.

USPTO; Corrected Notice of Allowance dated Apr. 9, 2025 in U.S. Appl. No. 17/747,816.

USPTO; Corrected Notice of Allowance dated Mar. 12, 2025 in U.S. Appl. No. 17/571,083.

USPTO; Corrected Notice of Allowance dated May 7, 2025 in U.S. Appl. No. 17/571,083.

USPTO; Notice of Allowance dated May 19, 2025 in U.S. Appl. No. 18/120,785.

USPTO; Non-Final Office Action dated May 15, 2025 in U.S. Appl. No. 18/186,821.

USPTO; Requirement for Restriction/ Election dated May 14, 2025 in U.S. Appl. No. 18/186,844.

USPTO; Final Office Action dated Apr. 30, 2025 in U.S. Appl. No. 18/765,864.

USPTO; Requirement for Restriction/ Election dated May 15, 2025 in U.S. Appl. No. 18/186,785.

USPTO; Corrected Notice of Allowance dated Apr. 30, 2025 in U.S. Appl. No. 17/308,776.

USPTO; Advisory Action dated Apr. 26, 2024 in U.S. Appl. No. 17/079,239.

USPTO; Notice of Allowance dated Apr. 19, 2024 in U.S. Appl. No. 17/527,423.

USPTO, Final Office Action dated Jan. 25, 2024 in U.S. Appl. No. 17/079,239.

USPTO, Non-Final Office Action dated Jan. 16, 2024 in U.S. Appl. No. 17/527,423.

USPTO, Non-Final Office Action dated Feb. 1, 2024 in U.S. Appl. No. 17/671,361.

USPTO; Notice of Allowance dated Feb. 13, 2025 in U.S. Appl. No. 17/747,816.

USPTO; Notice of Allowance dated Feb. 5, 2025 in U.S. Appl. No. 17/747,816.

USPTO; Non-Final Office Action dated Feb. 20, 2025 in U.S. Appl. No. 18/186,821.

European Patent Office, European Office Action dated Aug. 27, 2024 in Application No. 1919130601014.

European Patent Office, European Search Report dated Aug. 27, 2024 in Application No. 24163857.6.

USPTO; Requirement for Restriction/ Election dated Oct. 10, 2024 in U.S. Appl. No. 17/571,083.

USPTO; Notice of Allowance dated Jun. 3, 2025 in U.S. Appl. No. 18/765,864.

USPTO; Final Office Action dated Jun. 13, 2025 in U.S. Appl. No. 17/671,361.

European Patent Office, European Office Action dated May 27, 2025 in Application No. 19207148.8.

USPTO, Final Office Action dated Aug. 22, 2022 in U.S. Appl. No. 16/029,134.

USPTO, Corrected Notice of Allowance dated Aug. 31, 2022 in U.S. Appl. No. 17/330,163.

European Patent Office, European Search Report dated Sep. 23, 2022 in Application No. 22171665.7.

USPTO, Corrected Notice of Allowance dated Oct. 17, 2022 in U.S. Appl. No. 17/378,207.

USPTO; Notice of Allowance dated Dec. 3, 2024 in U.S. Appl. No. 17/079,239.

USPTO; Non-Final Office Action dated Dec. 17, 2024 in U.S. Appl. No. 17/571,083.

(56)  References Cited

OTHER PUBLICATIONS

USPTO; Non-Final Office Action dated Jan. 21, 2025 in U.S. Appl. No. 18/765,864.
USPTO; Non-Final Office Action dated May 21, 2024 in U.S. Appl. No. 17/079,239.
USPTO, Corrected Notice of Allowance dated Mar. 1, 2023 in U.S. Appl. No. 16/190,817.
European Patent Office, European Office Action dated Feb. 17, 2023 in Application No. 1718011.7.
USPTO, Requirement for Restriction dated Apr. 26, 2023 in U.S. Appl. No. 17/079,239.
USPTO, Non-Final Office Action dated Mar. 30, 2023 in U.S. Appl. No. 17/671,361.
European Patent Office, European Search Report dated Apr. 12, 2023 in Application No. 22207343.9.
European Patent Office, European Search Report dated May 23, 2023 in Application No. 23150808.6.
Chemical Abstracts, (Aug. 12, 1985), vol. 103, ISSN 0009-2258, XP000189303 [A] 1-15 * abstract *.
Buchanan F J, et al. "Particulate-containing glass sealents for carbon-carbon composites" Carbon, Elsevier Oxford, GB, vol. 33, No. 4, 1995, pp. 491-497.
USPTO, Non-Final Office Action dated Jul. 13, 2023 in U.S. Appl. No. 17/079,239.
European Patent Office, European Search Report dated Jul. 7, 2023 in Application No. 23156560.7.
USPTO; Non-Final Office Action dated Jun. 18, 2024 in U.S. Appl. No. 17/308,776.
USPTO, Notice of Allowance dated Dec. 21, 2022 in U.S. Appl. No. 16/190,817.
USPTO, Advisory Action dated Nov. 1, 2022 in U.S. Appl. No. 16/029,134.
European Patent Office, European Office Action dated Aug. 18, 2022 in Application No. 17183478.1.
European Patent Office, European Office Action dated Nov. 24, 2022 in Application No. 19184523.9.
European Patent Office, European Office Action dated Jan. 26, 2023 in Application No. 19207148.8.
USPTO, Notice of Allowance dated Jul. 8, 2022 in U.S. Appl. No. 17/330,163.
USPTO, Notice of Allowance dated Jun. 29, 2022 in U.S. Appl. No. 17/378,207.
USPTO, First Action Interview Office Action dated Jun. 30, 2022 in U.S. Appl. No. 16/190,817.
European Patent Office, European Office Action dated Sep. 1, 2023 in Application No. 19184523.9.
European Patent Office, European Search Report dated Sep. 22, 2023 in Application No. 23173619.0.
Pechentkovskaya L. E. et al., "Effect of the different crystal structures of boron nitride on its high-temperature stability in oxygen", Soviet Powder Metallurgy and Metal Ceramics, [Online] vol. 20, No. 7, Jul. 1981 (Jul. 1981), pp. 510-512, DOI: 10.1007/BF00800535, Retrieved from the Internet: url: https://link.springer.com/article/10.1007/BF00800535, [retrieved on Sep. 13, 2023].
USPTO, Final Office Action dated Sep. 28, 2023 in U.S. Appl. No. 17/671,361.
USPTO, Examiner's Answer to Appeal Brief dated Sep. 7, 2023 in U.S. Appl. No. 16/029,134.
International Searching Authority, International Search Report and Written Opinion dated Apr. 20, 2005 in Application No. PCT/US2004/012222.
International Searching Authority, International Preliminary Report on Patentability dated Aug. 18, 2005 in Application No. PCT/US2004/012222.
International Searching Authority, International Search Report and Written Opinion dated Jul. 3, 2007 in Application No. PCT/US2006/043343.
European Patent Office, Office Action dated Jan. 4, 2008 in Application No. 04816727.4.

USPTO, Office Action dated Feb. 26, 2008 in U.S. Appl. No. 10/829,144.
International Searching Authority, International Preliminary Report on Patentability dated Mar. 12, 2008 in Application No. PCT/US2006/043343.
USPTO, Final Office Action dated Jul. 16, 2008 in U.S. Appl. No. 10/829,144.
USPTO, Office Action dated Oct. 24, 2008 in U.S. Appl. No. 10/829,144.
European Patent Office, Communication Pursuant to Article 94(3) EPC dated Oct. 28, 2008 in European Application No. 06837063.4.
USPTO, Restriction Requirement dated Feb. 5, 2009 in U.S. Appl. No. 11/315,592.
USPTO, Final Office Action dated Jan. 29, 2009 in U.S. Appl. No. 10/829,144.
European Patent Office, Communication Pursuant to Article 94(3) EPC dated Feb. 9, 2009 in European Application No. 06837063.4.
USPTO, Office Action dated May 29, 2009 in U.S. Appl. No. 10/829,144.
USPTO, Office Action dated Jun. 9, 2009 in U.S. Appl. No. 11/315,592.
USPTO, Notice of Allowance dated Oct. 1, 2009 in U.S. Appl. No. 10/829,144.
USPTO, Final Office Action dated Dec. 11, 2009 in U.S. Appl. No. 11/315,592.
European Patent Office, Communication under Rule 71(3) EPC dated Feb. 4, 2010 in European Application No. 06837063.4.
USPTO, Advisory Action dated Feb. 25, 2010 in U.S. Appl. No. 11/315,592.
USPTO, Office Action dated Apr. 1, 2010 in U.S. Appl. No. 11/315,592.
European Patent Office, Partial European Search Report dated Oct. 29, 2010 in European Application No. 10169627.6.
USPTO, Office Action dated Feb. 4, 2011 in U.S. Appl. No. 12/619,061.
USPTO, Office Action dated Feb. 22, 2011 in U.S. Appl. No. 12/829,178.
European Patent Office, Extended European Search Report dated May 4, 2011 in European Application No. 10169627.6.
USPTO, Final Office Action dated Aug. 19, 2011 in U.S. Appl. No. 12/829,178.
USPTO, Advisory Action dated Oct. 27, 2011 in U.S. Appl. No. 12/829,178.
U.S. Appl. No. 15/076,348, filed Mar. 21, 2016 titled "High Temperature Oxidation Protection for Composites," 42 pages.
U.S. Appl. No. 15/169,219, filed May 31, 2016 titled "High Temperature Oxidation Protection for Composites," 37 pages.
U.S. Appl. No. 15/174,537, filed Jun. 6, 2016 titled "Nanocomposite Coatings for Oxidation Protection for Composites," 44 pages.
U.S. Appl. No. 15/194,034, filed Jun. 27, 2016 titled "High Temperature Oxidation Protection for Composites," 49 pages.
U.S. Appl. No. 15/169,257, filed May 31, 2016 titled "High Temperature Oxidation Protection for Composites," 40 pages.
U.S. Appl. No. 15/234,903, filed Aug. 11, 2016 titled "High Temperature Oxidation Protection for Composites," 41 pages.
U.S. Appl. No. 15/380,442, filed Dec. 15, 2016 titled "High Temperature Oxidation Protection for Composites," 41 pages.
European Patent Office, Extended European Search Report dated Jul. 26, 2016 in European Application No. 16161832.7.
USPTO, Restriction Requirement dated Nov. 7, 2016 in U.S. Appl. No. 14/671,637.
USPTO, Pre-Interview First Office Action dated Mar. 6, 2017 in U.S. Appl. No. 14/671,637.
USPTO, First Action Interview Office Action dated May 12, 2017 in U.S. Appl. No. 14/671,637.
USPTO, Restriction Requirement dated Jan. 5, 2018 in U.S. Appl. No. 15/076,348.
European Patent Office, Extended European Search Report dated Aug. 2, 2017 in European Application No. 17159538.2.
Rovner; "A Haven for Glass, Ceramics"; Science & Technology; May 24, 2004; pp. 33-39.
Air Products and Chemicals, Inc., "Complete Product Offering," 4 pages, retrieved from www.airproducts.com on Jun. 28, 2004.

(56)  References Cited

OTHER PUBLICATIONS

McKee, Chemistry and Physics of Carbon, vol. 16, P.L. Walker and P.A. Thrower eds., Marcel Dekker, 1981, p. 30-42.
Sosman, "The Common Refractory Oxides," The Journal of Industrial and Engineering Chemistry, vol. 8, No. 11, Nov. 1916, pp. 985-990.
Almatis Website, C-333, Accessed Feb. 8, 2011, p. 1.
Montedo et al., Crystallisation Kinetics of a B-Spodumene-Based Glass Ceramic, Advances in Materials Science and Engineering, pp. 1-9, vol. 2012, Article ID 525428, Hindawi Publishing Corporation.
European Patent Office, Extended European Search Report dated Oct. 9, 2017 in European Application No. 17173709.1.
European Patent Office, Extended European Search Report dated Oct. 17, 2017 in European Application No. 17173707.5.
Sun Lee W et al., "Comparative study of thermally conductive fillers in underfill for the electronic components", Diamond and Related Materials, Elsevier Science Publishers, Amsterdam, NL, vol. 14, No. 10, Oct. 1, 2005 (Oct. 1, 2005), pp. 1647-1653.
Rockwood Lithium, Spodumene Concentrate SC 7.5 premium, Aug. 2015, pp. 1-2, The Lithium Company.
D.D.L. Chung: "Acid Aluminum Phosphate for the Binding and Coating of Materials", Journal of Materials Science, vol. 38, No. 13, 2003, pp. 2785-2791.
European Patent Office, Extended European Search Report dated Nov. 6, 2017 in European Application No. 17174481.6.
USPTO, Final Office Action dated Jan. 17, 2018 in U.S. Appl. No. 14/671,637.
European Patent Office, Communication Pursuant to Article 94(3) dated Jan. 3, 2018 in European Application No. 16161832.7.
European Patent Office, Extended European Search Report dated Nov. 20, 2017 in European Application No. 17175809.7.
European Patent Office, Extended European Search Report dated Nov. 20, 2017 in European Application No. 17178011.7.
European Patent Office, Partial European Search Report dated Jan. 3, 2018 in European Application No. 17183478.1.
USPTO, Advisory Action dated Mar. 30, 2018 in U.S. Appl. No. 14/671,637.
USPTO, Non-Final Office Action dated May 1, 2018 in U.S. Appl. No. 15/076,348.
USPTO, Restriction/Election Requirement dated May 24, 2018 in U.S. Appl. No. 15/174,537.
USPTO, Non-Final Office Action dated Mar. 28, 2018 in U.S. Appl. No. 15/234,903.
European Patent Office, European Search Report dated Apr. 11, 2018 in European Application No. 17183478.1-1103.
European Patent Office, European Search Report dated Apr. 13, 2018 in European Application No. 17207767.9-1106.
USPTO, Restriction/Election Requirement dated Jun. 19, 2018 in U.S. Appl. No. 15/194,034.
USPTO, Notice of Allowance dated Jun. 5, 2018 in U.S. Appl. No. 14/671,637.
USPTO, Corrected Notice of Allowance dated Jun. 22, 2018 in U.S. Appl. No. 14/671,637.
USPTO, Non-Final Office Action dated Jul. 27, 2018 in U.S. Appl. No. 15/174,537.
Steven A. Poteet, et al., U.S. Appl. No. 16/029,134, filed Jul. 6, 2018 titled "High Temperature Oxidation Protection for Composites ," 43 pages.
Steven A. Poteet, et al., U.S. Appl. No. 15/886,671, filed Feb. 1, 2018 titled "High Temperature Oxidation Protection for Composites," 45 pages.
European Patent Office, European Office Action date Jul. 16, 2018 in Application No. 17174481.6.
Steven A. Poteet, U.S. Appl. No. 16/102,100, filed Aug. 13, 2018 titled "High Temperature Oxidation Protection for Composites ," 47 pages.
USPTO, Notice of Allowance dated Aug. 24, 2018 in U.S. Appl. No. 14/671,637.

Anthony Mazany, U.S. Appl. No. 16/116,665, filed Aug. 29, 2018 titled "Formulations for Oxidation Protection of Composite Articles", 30 pages.
USPTO, Restriction/Election Requirement dated Aug. 30, 2018 in U.S. Appl. No. 15/169,219.
USPTO, Restriction/Election Requirement dated Aug. 30, 2018 in U.S. Appl. No. 15/169,257.
USPTO, Final Office Action dated Oct. 26, 2018 in U.S. Appl. No. 15/234,903.
USPTO, Final Office Action dated Nov. 5, 2018 in U.S. Appl. No. 15/076,348.
Steven A. Poteet, U.S. Appl. No. 16/190,817, filed Nov. 14, 2018 titled "High Temperature Oxidation Protection for Composites", 38 pages.
USPTO, Non-Final Office Action filed Dec. 19, 2018 in U.S. Appl. No. 15/169,219.
USPTO, Non-Final Office Action filed Dec. 19, 2018 in U.S. Appl. No. 15/169,257.
USPTO, Non-Final Office Action filed Dec. 21, 2018 in U.S. Appl. No. 15/194,034.
USPTO, Advisory Action filed Dec. 28, 2018 in U.S. Appl. No. 15/076,348.
USPTO, Advisory Action filed Jan. 17, 2019 in U.S. Appl. No. 15/234,903.
USPTO, Final Office Action filed Feb. 14, 2019 in U.S. Appl. No. 15/174,537.
USPTO, Non-Final Office Action filed Feb. 25, 2019 in U.S. Appl. No. 15/234,903.
USPTO, Non-Final Office Action dated Apr. 16, 2019 in U.S. Appl. No. 15/076,348.
USPTO, Notice of Allowance dated Apr. 3, 2019 in U.S. Appl. No. 15/169,257.
USPTO, Advisory Action dated May 17, 2019 in U.S. Appl. No. 15/174,537.
USPTO, Final Office Action dated May 15, 2019 in U.S. Appl. No. 15/194,034.
USPTO, Restriction/Election Requirement dated Apr. 5, 2019 in U.S. Appl. No. 15/380,442.
USPTO, Non-Final Office Action filed Jun. 7, 2019 in U.S. Appl. No. 15/174,537.
USPTO, Notice of Allowance dated Jun. 17, 2019 in U.S. Appl. No. 15/169,257.
European Patent Office, European Office Action date Jun. 21, 2019 in Application No. 19155021.9.
USPTO, Notice of Allowance filed Jun. 26, 2019 in U.S. Appl. No. 15/169,219.
USPTO, Pre-Interview First Office Action dated Jul. 26, 2019 in U.S. Appl. No. 15/380,442.
USPTO, Notice of Allowance dated Aug. 13, 2019 in U.S. Appl. No. 15/194,034.
European Patent Office, Communication pursuant to Article 94(3) dated Aug. 28, 2019 in Application No. 17173707.5.
USPTO, Final Office Action filed Aug. 30, 2019 in U.S. Appl. No. 15/234,903.
The National Academics Press, Committee on Advanced Fibers for High-Temperature Ceramic Composites, Ceramic Fibers and Coatings: Advanced Materials for the Twenty-First Century, Chapter 6: Interfacial Coatings, (1998), p. 1-48 (Year: 1998).
USPTO, Notice of Allowance dated Sep. 25, 2019 in U.S. Appl. No. 15/380,442.
USPTO, Supplemental Notice of Allowance filed Oct. 2, 2019 in U.S. Appl. No. 15/169,219.
Steven A. Poteet, U.S. Appl. No. 16/666,809, filed Oct. 29, 2019 titled "High Temperature Oxidation Protection for Composites ," 45 pages.
USPTO, Advisory Action filed Nov. 20, 2019 in U.S. Appl. No. 15/234,903.
European Patent Office, European Search Report dated Nov. 25, 2019 in Application No. 19184523.9.
USPTO, Restriction/Election Requirement dated Dec. 13, 2019 in U.S. Appl. No. 15/886,671.
European Patent Office, European Search Report dated Dec. 13, 2019 in Application No. 19191306.0.

(56) References Cited

OTHER PUBLICATIONS

USPTO, Notice of Allowance dated Feb. 21, 2020 in U.S. Appl. No. 16/116,665.
European Patent Office, European Search Report dated Mar. 23, 2020 in Application No. 19207148.8.
USPTO, Pre-Interview First Office Action dated Apr. 17, 2020 in U.S. Appl. No. 15/886,671.
USPTO, Restriction/Election Requirement dated Apr. 30, 2020 in U.S. Appl. No. 16/029,134.
USPTO, Notice of Allowance filed May 1, 2020 in U.S. Appl. No. 15/234,903.
USPTO, Corrected Notice of Allowance dated May 28, 2020 in U.S. Appl. No. 16/116,665.
USPTO, First Action Interview Office Action dated Jun. 4, 2020 in U.S. Appl. No. 15/886,671.
USPTO, Corrected Notice of Allowance filed Jul. 9, 2020 in U.S. Appl. No. 15/234,903.
USPTO, Corrected Notice of Allowance filed Aug. 7, 2020 in U.S. Appl. No. 15/234,903.
USPTO, Restriction/Election Requirement filed Jul. 14, 2020 in U.S. Appl. No. 16/102,100.
USPTO, Final Office Action dated Sep. 9, 2020 in U.S. Appl. No. 15/886,671.
USPTO, Non-Final Office Action dated Oct. 29, 2020 in U.S. Appl. No. 16/666,809.
European Patent Office, European Office Action dated Oct. 22, 2020 in Application No. 17173709.1.
USPTO, Advisory Action dated Nov. 17, 2020 in U.S. Appl. No. 15/886,671.
USPTO, Non-Final Office Action filed Nov. 17, 2020 in U.S. Appl. No. 16/102,100.
USPTO, Notice of Allowance dated Dec. 7, 2020 in U.S. Appl. No. 16/589,368.
European Patent Office, European Office Action dated Nov. 19, 2020 in Application No. 17178011.7.
USPTO, Notice of Allowance dated Jan. 1, 2021 in U.S. Appl. No. 16/453,593.
USPTO, Supplemental Notice of Allowance dated Feb. 9, 2021 in U.S. Appl. No. 16/589,368.
USPTO, Supplemental Notice of Allowance dated Feb. 9, 2021 in U.S. Appl. No. 16/453,593.
USPTO, Final Office Action dated Feb. 2, 2021 in U.S. Appl. No. 16/666,809.
USPTO, Supplemental Notice of Allowance dated Mar. 2, 2021 in U.S. Appl. No. 16/453,593.
USPTO, Notice of Allowance dated Mar. 8, 2021 in U.S. Appl. No. 16/102,100.
USPTO, Decision on Appeal dated Apr. 5, 2021 in U.S. Appl. No. 15/076,348.
USPTO, Advisory Action dated Apr. 7, 2021 in U.S. Appl. No. 16/666,809.
USPTO, Notice of Allowance dated Apr. 15, 2021 in U.S. Appl. No. 16/668,852.
U.S. Appl. No. 17/308,776, filed May 5, 2021 titled "High Temperature Oxidation Protection for Carbon-Carbon Composites," 41 pages.
European Patent Office, European Search Report dated May 10, 2021 in Application No. 20216996.7.
USPTO, Corrected Notice of Allowance dated Jun. 4, 2021 in U.S. Appl. No. 16/102,100.
European Patent Office, European Office Action dated Jul. 7, 2021 in Application No. 17183478.1.

USPTO, Corrected Notice of Allowance dated Jun. 11, 2021 in U.S. Appl. No. 16/668,852.
USPTO, Notice of Allowance dated Jul. 12, 2021 in U.S. Appl. No. 16/666,809.
European Patent Office, European Office Action dated Oct. 22, 2021 in Application No. 19191306.0.
USPTO, Non-Final Office Action dated Nov. 18, 2021 in U.S. Appl. No. 15/076,348.
USPTO, Restriction/Election Requirement dated Dec. 1, 2021 in U.S. Appl. No. 16/190,817.
USPTO, Notice of Allowance dated Feb. 1, 2022 in U.S. Appl. No. 17/185,016.
U.S. Appl. No. 17/527,423, filed Nov. 16, 2021 entitled "High Temperature Oxidation Protection for Carbon-Carbon Composites," 41 pages.
USPTO, Supplemental Notice of Allowance dated Feb. 24, 2022 in U.S. Appl. No. 17/185,016.
USPTO, Pre-Interview First Office Action dated Mar. 21, 2022 in U.S. Appl. No. 16/029,134.
USPTO, Pre-Interview Office Action dated Mar. 1, 2022, in U.S. Appl. No. 16/190,817.
Eckel, Zak C., et al. "Additive Manufacturing of Polymer-derived Ceramics". Science 351, (2016), vol. 351, p. 58-62. DOI: 10.1126/science.aad2688.
USPTO, First Action Interview Office Action dated May 9, 2022 in U.S. Appl. No. 16/029,134.
USPTO, Notice of Allowance dated May 25, 2022 in U.S. Appl. No. 17/330,163.
USPTO; Non-Final Office Action dated Aug. 5, 2025 in U.S. Appl. No. 18/186,785.
USPTO; Notice of Allowance dated Jul. 28, 2025 in U.S. Appl. No. 18/120,785.
USPTO; Non-Final Office Action dated Aug. 5, 2025 in U.S. Appl. No. 18/186,844.
USPTO; Final Office Action dated Jun. 27, 2024 in U.S. Appl. No. 17/671,361.
USPTO; Requirement for Restriction dated Jul. 17, 2024 in U.S. Appl. No. 17/747,816.
European Patent Office, European Search Report dated Aug. 27, 2024 in Application No. 24164939.1.
European Patent Office, European Search Report dated Sep. 4, 2024 in Application No. 24164789.0.
USPTO; Advisory Action dated Sep. 5, 2024 in U.S. Appl. No. 17/671,361.
Tsung-Ming et al.: "On the Oxidation Kinetics and Mechanisms of Various SiC-Coated Carbon-Carbon Composites", Carbon, Elsevier Oxford, GB, vol. 29, No. 8, 1991, pp. 1257-1265, XP024029999, ISSN: 0008-6223, DOI: 10.1016/ 0008-6223(91)90045-K.
USPTO; Notice of Allowance dated Mar. 12, 2025 in U.S. Appl. No. 17/571,083.
USPTO; Notice of Allowance dated Mar. 12, 2025 in U.S. Appl. No. 17/747,816.
European Patent Office, European Search Report dated Nov. 20, 2023 in Application No. 23179864.6.
Liu et al: "Effect of Al2O3 addition on the microstructure and oxidation behavior of SiC coating prepared by pack cementation on C/C composites", Ceramics International, Elsevier, Amsterdam, NL, vol. 47, No. 20, Jul. 13, 2021 (Jul. 13, 2021), pp. 29309-29319, XP086762324, ISSN: 0272-8842, DOI: 10.1016/J.CERAMINT.2021.07.096 [retrieved on Jul. 13, 2021].
USPTO, Restriction/Election Requirement dated Dec. 15, 2023 in U.S. Appl. No. 17/308,776.
USPTO, Advisory Action dated Dec. 8, 2023 in U.S. Appl. No. 17/671,361.

* cited by examiner

300

Apply boron slurry to composite
structure ⟶ 306

Dry composite structure to form
boron layer ⟶ 308

Form ceramic layer slurry ⟶ 210

Apply ceramic layer slurry to
composite structure ⟶ 220

Heat composite structure to form
ceramic layer ⟶ 230

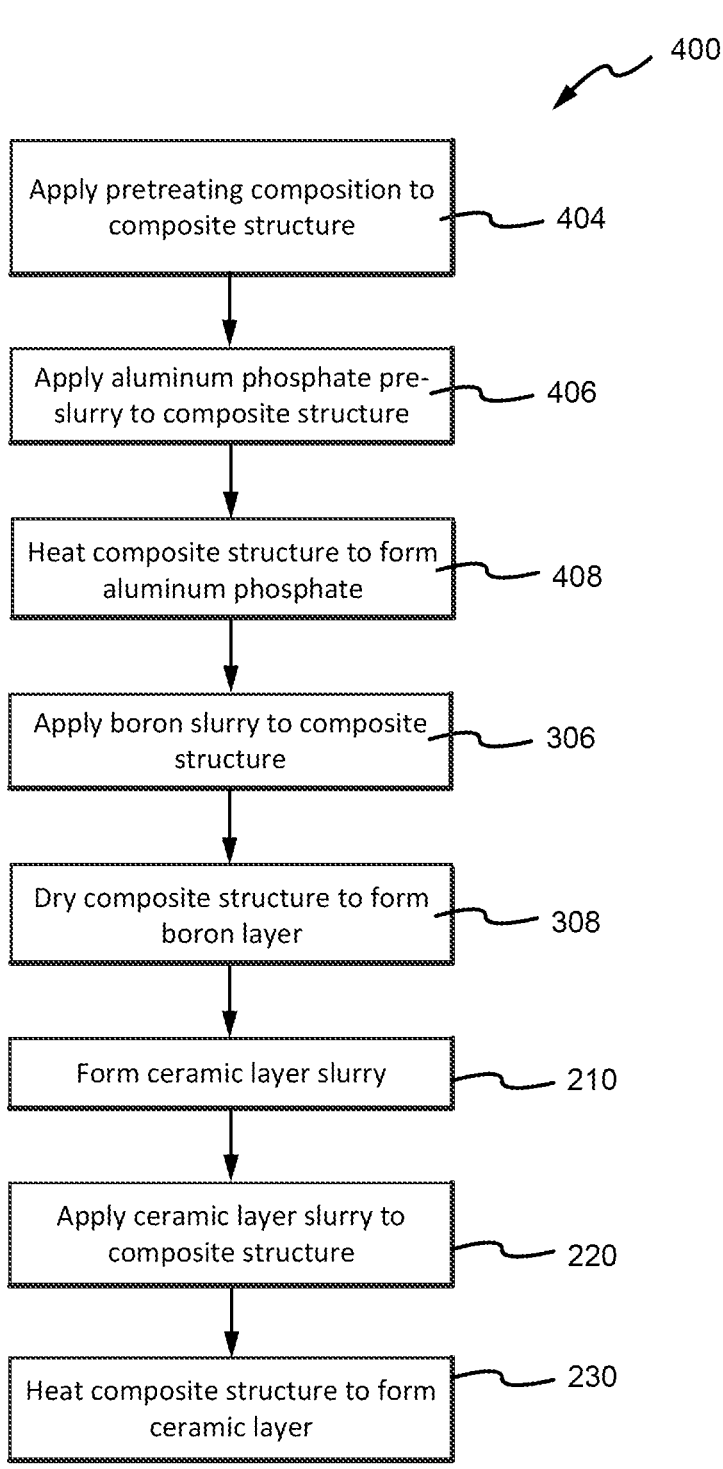

400

Apply pretreating composition to composite structure — 404

Apply aluminum phosphate pre-slurry to composite structure — 406

Heat composite structure to form aluminum phosphate — 408

Apply boron slurry to composite structure — 306

Dry composite structure to form boron layer — 308

Form ceramic layer slurry — 210

Apply ceramic layer slurry to composite structure — 220

Heat composite structure to form ceramic layer — 230

FIG.2C

OXIDATION PROTECTION FOR CARBON-CARBON COMPOSITES

FIELD

The present disclosure relates generally to composites and, more specifically, to oxidation protection systems for carbon-carbon composite structures.

BACKGROUND

Oxidation protection systems for carbon-carbon composites are typically designed to minimize loss of carbon material due to oxidation at operating conditions, which include temperatures of 800° C. (1472° F.) or higher. Layers comprising ceramic materials within an oxidation protection system that are deposited onto a substrate by chemical vapor deposition ("CVD") may provide desirable oxidation protection. However, CVD processes may be expensive and cost-prohibitive.

SUMMARY

A method for forming an oxidation protection system on a composite structure is disclosed, comprising applying a ceramic layer slurry to the composite structure, wherein the ceramic layer slurry comprises aluminum and silicon carbide in a sol, and heating the composite structure to form a ceramic layer on the composite structure, wherein the ceramic layer comprises between 1% and 20% alumina by weight.

In various embodiments, the sol comprises methyltrimethoxysilane and water.

In various embodiments, the method further comprises applying a sealing slurry to the composite structure, wherein the sealing slurry comprises a sealing pre-slurry composition and a sealing carrier fluid, wherein the sealing pre-slurry composition comprises a sealing glass composition, and heating the composite structure to form a sealing layer on the ceramic layer.

In various embodiments, the sealing glass composition is represented by a formula $a(A'_2O)_x(P_2O_5)_{y1}b(G_fO)_{y2}$ $c(A''O)_z$. A' is selected from: lithium, sodium, potassium, rubidium, cesium, and mixtures thereof. $G_f$ is selected from: boron, silicon, sulfur, germanium, arsenic, antimony, and mixtures thereof. A'' is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof. a is a number in a range from 1 to about 5. b is a number in a range from 0 to about 10. c is a number in a range from 0 to about 30. x is a number in a range from about 0.050 to about 0.500. $y_1$ is a number in a range from about 0.100 to about 0.950. $y_2$ is a number in a range from 0 to about 0.20. z is a number in a range from about 0.01 to about 0.5. $(x+y_1+y_2+z)=1$. $x<(y_1+y_2)$.

In various embodiments, the method further comprises preparing the ceramic layer slurry by combining methyltrimethoxysilane and water to form the sol and mixing aluminum powder and silicon carbide powder in the sol.

In various embodiments, the ceramic layer slurry comprises between 1% and 10% by weight aluminum powder.

In various embodiments, the ceramic layer slurry comprises between 10% and 50% by weight silicon carbide powder.

In various embodiments, the ceramic layer comprises between 1% and 15% by weight alumina.

In various embodiments, the ceramic layer comprises between 50% and 80% by weight silicon carbide.

In various embodiments, the ceramic layer comprises between 10% and 30% by weight silicon oxycarbide.

In various embodiments, the method further comprises applying a boron slurry to the composite structure prior to the applying the ceramic layer slurry.

In various embodiments, the method further comprises forming the boron slurry by combining boron carbide and a carrier fluid.

In various embodiments, the method further comprises applying a pretreating composition to the composite structure prior to applying the boron slurry.

In various embodiments, applying the pretreating composition to the composite structure comprises applying a first pretreating composition comprising aluminum oxide in water to the composite structure, heating the composite structure to a temperature sufficient remove the water and fix the aluminum oxide in place.

In various embodiments, applying the pretreating composition to the composite structure further comprises applying a second pretreating composition. In various embodiments, the second pretreating composition comprises phosphoric acid and at least one of aluminum phosphate, aluminum hydroxide, or aluminum oxide. In various embodiments, the second pretreating composition comprises ammonium dihydrogen phosphate. In various embodiments, the second pretreating composition comprises aluminum orthophosphate. In various embodiments, the second pretreating composition comprises aluminum phosphate.

An oxidation protection system disposed on an outer surface of a substrate is disclosed. In various embodiments, the oxidation protection system comprises a ceramic layer comprising between 1% and 20% by weight alumina, between 50% and 80% silicon carbide, and between 10% and 30% by weight silicon oxycarbide, and a sealing layer comprising a sealing glass composition located over the ceramic layer.

In various embodiments, the oxidation protection system further comprises a boron layer formed between the ceramic layer and the substrate.

In various embodiments, the ceramic layer comprises about 5% by weight alumina, about 75% by weight silicon carbide and about 20% by weight silicon oxycarbide.

An aircraft brake disk is disclosed, comprising a carbon-carbon composite structure comprising a non-friction surface, and an oxidation protection system disposed on the non-friction surface. The oxidation protection system includes a ceramic layer comprising between 1% and 20% by weight alumina, between 50% and 80% silicon carbide, and between 10% and 30% by weight silicon oxycarbide, and a sealing layer comprising a sealing glass composition located over the ceramic layer.

In various embodiments, the oxidation protection system further comprising a boron layer formed between the ceramic layer and the non-friction surface.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 2A, 2B, 2C, and 2D illustrate methods for coating a composite structure, in accordance with various embodiments;

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

Figure 1A:
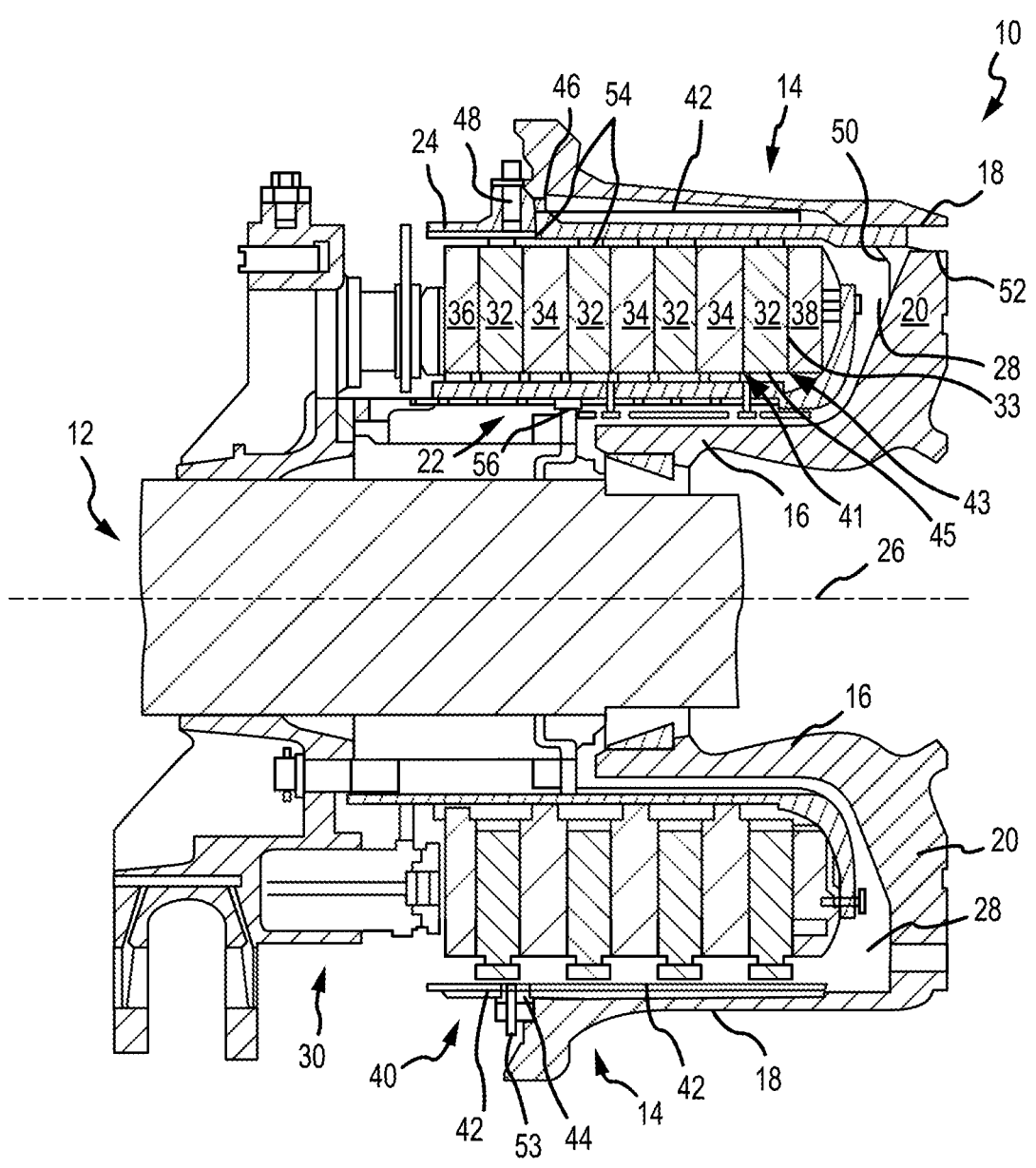
FIG. 1A illustrates a cross sectional view of an aircraft wheel braking assembly, in accordance with various embodiments.
Figure 1B:
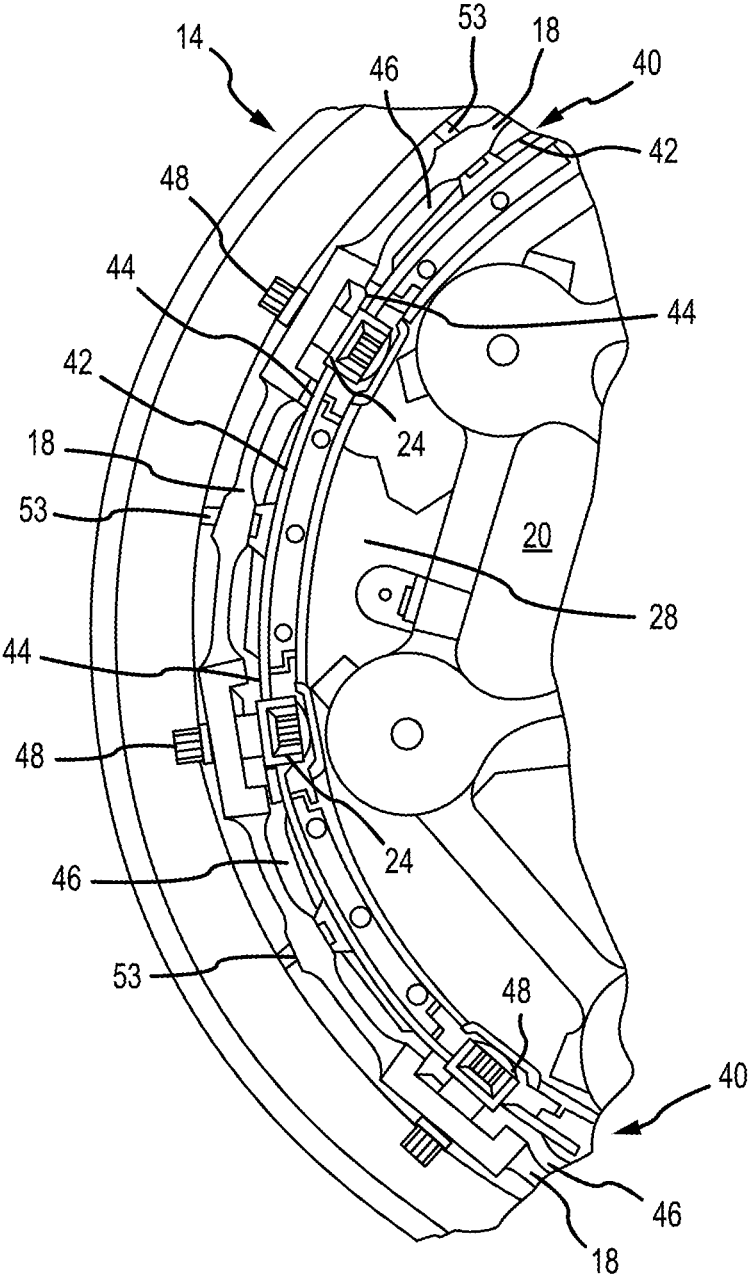
FIG. 1B illustrates a partial side view of an aircraft wheel braking assembly, in accordance with various embodiments.

With initial reference to FIGS. 1A and 1B, aircraft wheel braking assembly 10 such as may be found on an aircraft, in accordance with various embodiments is illustrated. Aircraft wheel braking assembly may, for example, comprise a bogie axle 12, a wheel 14 including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield segments 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56. FIG. 1B illustrates a portion of aircraft wheel braking assembly 10 as viewed into wheel well 18 and wheel well recess 28.

In various embodiments, the various components of aircraft wheel braking assembly 10 may be subjected to the application of compositions and methods for protecting the components from oxidation.

Brake disks (e.g., interleaved rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress interleaved rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows rotation of wheel 14. Torque take-out assembly 22 is secured to a stationary portion of the landing gear truck such as a bogie beam or other landing gear strut, such that torque take-out assembly 22 and stators 34 are prevented from rotating during braking of the aircraft.

Carbon-carbon composites (also referred to herein as composite structures, composite substrates, and carbon-carbon composite structures, interchangeably) in the friction disks may operate as a heat sink to absorb large amounts of kinetic energy converted to heat during slowing of the aircraft. Heat shield 40 may reflect thermal energy away from wheel well 18 and back toward rotors 32 and stators 34. With reference to FIG. 1A, a portion of wheel well 18 and torque bar 24 is removed to better illustrate heat shield 40 and heat shield segments 42. With reference to FIG. 1B, heat shield 40 is attached to wheel 14 and is concentric with wheel well 18. Individual heat shield segments 42 may be secured in place between wheel well 18 and rotors 32 by respective heat shield carriers 44 fixed to wheel well 18. Air gap 46 is defined annularly between heat shield segments 42 and wheel well 18.

Torque bars 24 and heat shield carriers 44 can be secured to wheel 14 using bolts or other fasteners. Torque bar bolts 48 can extend through a hole formed in a flange or other mounting surface on wheel 14. Each torque bar 24 can optionally include at least one torque bar pin 50 at an end opposite torque bar bolts 48, such that torque bar pin 50 can be received through wheel web hole 52 in web 20. Heat shield segments 42 and respective heat shield carriers 44 can then be fastened to wheel well 18 by heat shield fasteners 53.

Under the operating conditions (e.g., high temperature) of aircraft wheel braking assembly 10, carbon-carbon composites may be prone to material loss from oxidation of the carbon. For example, various carbon-carbon composite components of aircraft wheel braking assembly 10 may experience both catalytic oxidation and inherent thermal oxidation caused by heating the composite during operation. In various embodiments, composite rotors 32 and stators 34 may be heated to sufficiently high temperatures that may oxidize the carbon surfaces exposed to air. At elevated temperatures, infiltration of air and contaminants may cause internal oxidation and weakening, especially in and around rotor lugs 54 or stator slots 56 securing the friction disks to the respective torque bar 24 and torque take-out assembly 22. Because carbon-carbon composite components of aircraft wheel braking assembly 10 may retain heat for a substantial time period after slowing the aircraft, oxygen from the ambient atmosphere may react with the carbon matrix and/or carbon fibers to accelerate material loss. Further, damage to brake components may be caused by the oxidation enlargement of cracks around fibers or enlargement of cracks in a reaction-formed porous barrier coating (e.g., a silicon-based barrier coating) applied to the carbon-carbon composite.

Elements identified in severely oxidized regions of carbon-carbon composite brake components include potassium (K) and sodium (Na). These alkali contaminants may come into contact with aircraft brakes as part of cleaning or de-icing materials. Other sources include salt (e.g., NaCl) deposits left from seawater or sea spray. These and other contaminants (e.g., Ca ions, Fe ions, oxides and salts containing Fe ions and/or Ca ions, etc.) can penetrate and leave deposits in the pores of carbon-carbon composite aircraft brakes, including the substrate and any reaction-formed porous barrier coating. When such contamination occurs, the rate of carbon loss by oxidation can be increased by one to two orders of magnitude.

In various embodiments, components of aircraft wheel braking assembly 10 may reach operating temperatures in the range from about 100° C. (212° F.) up to about 900° C. (1652° F.), or higher (e.g., 1093° C. (2000° F.) on a wear or friction surface of a brake disk). However, it will be recognized that the oxidation protection systems compositions and methods of the present disclosure may be readily adapted to many parts in this and other braking assemblies, as well as to other carbon-carbon composite structures susceptible to oxidation losses from infiltration of atmospheric oxygen and/or catalytic contaminants.

In various embodiments, a method for limiting an oxidation reaction in a substrate (e.g., a composite structure) may comprise forming an oxidation protection system on the composite structure. Forming the oxidation protection system may comprise forming a ceramic layer slurry by combining aluminum and silicon carbide in a solution (a "sol"), applying the ceramic layer slurry to a composite structure, and heating the composite structure to a temperature sufficient to form a ceramic layer on the composite structure. Heating the ceramic layer may include exposing the composite structure and ceramic layer slurry to an inert gas, for example, heating the composite structure in the presence of nitrogen gas or argon gas.

In various embodiments, forming the oxidation protection system may further comprise applying a boron slurry, comprising a boron powder in a carrier fluid (such as, for example, water or alcohol), to the composite structure and heating the composite structure to a temperature sufficient to form a boron layer over the composite structure, prior to applying the ceramic layer slurry. In various embodiments, forming the oxidation protection system may further comprise applying a pretreatment composition (also referred to herein as a pretreatment layer) to the composite structure prior to applying the ceramic layer and/or the boron slurry. In various embodiments, forming the oxidation protection system may further comprise forming a sealing composition (also referred to herein as a sealing layer), comprising a sealing glass composition (in the form of a glass frit, powder, or other suitable pulverized form) in a carrier fluid (such as, for example, water), applying the sealing slurry to a composite structure, and heating the composite structure to a temperature sufficient to dry the carrier fluid and form a sealing coating on the ceramic layer. In various embodiments, the sealing slurry may comprise a sealing pre-slurry composition including additives, such as, for example, ammonium dihydrogen phosphate and/or aluminum ortho-phosphate, among others, to improve hydrolytic stability and/or to increase the composite structure's resistance to oxidation, thereby tending to reduce mass loss of composite structure.

Figure 2A:
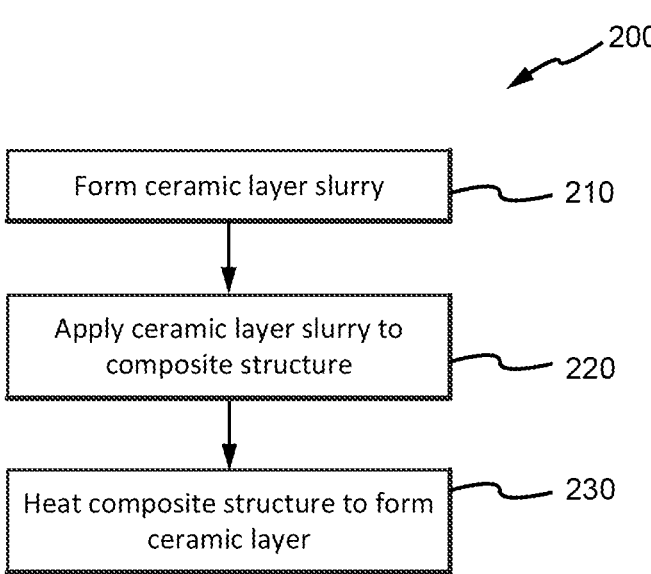

With initial reference to FIGS. 1A and 2A, a method 200 for forming an oxidation protection system on a composite structure, in accordance with various embodiments, is illustrated. Method 200 may, for example, comprise forming an oxidation protection system on non-wearing surfaces of carbon-carbon composite brake components, such as non-wear surfaces 45 and/or rotor lugs 54. Non-wear surfaces (e.g., non-wear surface 45, as labeled in FIG. 1A) simply reference an exemplary non-wear surface on a brake disk (i.e., a non-friction surface that does not contribute to brake function by having friction with another component, such as another brake disk), but non-wear surfaces similar to non-wear surface 45 may be present on any brake disks (e.g., rotors 32, stators 34, pressure plate 36, end plate 38, or the like). In various embodiments, method 200 may be used on the back face of pressure plate 36 and/or end plate 38, an inner diameter (ID) surface of stators 34 including stator slots 56, as well as outer diameter (OD) surfaces of rotors 32 including lugs 54. The oxidation inhibiting composition of method 200 may be applied to preselected regions of a carbon-carbon composite structure that may be otherwise susceptible to oxidation. For example, aircraft brake disks may have the oxidation inhibiting composition applied on or proximate stator slots 56, rotor lugs 54, and/or non-wear surface 45.

In various embodiments, method 200 may comprise forming a ceramic layer slurry (step 210). The ceramic layer slurry may comprise aluminum and silicon carbide (SiC). The aluminum and silicon carbide may be in powder form. The aluminum and silicon carbide may be added to a solution or carrier fluid. The solution or carrier fluid may comprise any suitable fluid, such as water, methyltrimethoxysilane ("MTMS"), hexane, cyclohexane, polyvinyl alcohol (PVA), isopropyl alcohol (or other alcohol), any combination of the foregoing, and/or the like. In various embodiments, the aluminum powder and silicon carbide powder is added to a sol comprised of MTMS and water. In this regard, the ceramic layer slurry may be formed by mixing MTMS and water to form a sol. In various embodiments, the sol may comprise between 1% and 50% by weight MTMS, between 10% and 35% by weight MTMS, between 20% and 30% by weight MTMS, or about 25% by weight MTMS. In various embodiments, the sol may comprise between 50% and 99% by weight water, between 65% and 90% by weight water, between 70% and 80% by weight water, or about 75% by weight water. After forming the sol, the aluminum powder and silicon carbide powder may be mixed into the sol via any suitable method, such as stirring, tumbling, or ball milling. The aluminum powder and silicon carbide powder may be mixed into the sol for any suitable duration. For example, such mixing may take place for under an hour, over an hour, or for multiple hours, between two and ten hours. In various embodiments, the aluminum powder and silicon carbide powder may be mixed into the sol for between two and four hours, for about two hours, or about three hours (the term "about" as used in this context means plus or minus 30 minutes).

In various embodiments, the aluminum and silicon carbide powders (collectively referred to as the "Al—SiC solids") may form between 15% and 80% by weight of the ceramic layer slurry, between 30% and 70% by weight of the ceramic layer slurry, between 40% and 60% by weight of the ceramic layer slurry, or between 40% and 50% by weight of the ceramic layer slurry, with the sol (i.e., the carrier fluid(s)) forming the remaining weight percentage of the ceramic layer slurry. In various embodiments, the Al—SiC solids may form about 40% or about 45% by weight of the ceramic layer slurry, with the sol (i.e., carrier fluid(s)) forming the remaining weight percentage of the ceramic layer slurry (the term "about" in this context means plus or minus 5 weight percent).

In various embodiments, the ceramic layer slurry may comprise between 0% and 20% by weight aluminum powder, between 1% and 10% by weight aluminum powder, between 1% and 5% by weight aluminum powder, or about 3% by weight aluminum powder (the term "about" in this context means plus or minus 1 weight percent). In various embodiments, the ceramic layer slurry may comprise between 0% and 60% by weight silicon carbide powder, between 10% and 50% by weight silicon carbide powder, between 25% and 40% by weight silicon carbide powder, or about 35% by weight silicon carbide powder (the term "about" in this context means plus or minus 1 weight percent).

In various embodiments, the ceramic layer slurry may further comprise a binder (but in further embodiments, the ceramic layer slurry may not comprise a binder). The binder may comprise any suitable compound, such as silicon oxycarbide, silicon oxycarbide generating sol, silicon oxycarbide pre-ceramic polymer, and/or polyvinyl alcohol. In various embodiments, the binder may comprise between 0.2% and 15% by weight of the ceramic layer slurry, between 5% and 15% by weight of the ceramic layer slurry, or about 10% or about 12% by weight of the ceramic layer slurry (the term "about" in this context means plus or minus 5 weight percent).

In various embodiments, method 200 further comprises applying the ceramic layer slurry to a composite structure (step 220). Applying the ceramic layer slurry may comprise, for example, spraying or brushing the ceramic layer slurry to an outer surface of the composite structure (e.g., a non-wear or non-friction surface) or dipping the outer surface of the composite structure in the ceramic layer slurry. In this regard, any suitable manner of applying the ceramic layer slurry to the composite structure is within the scope of the present disclosure. As referenced herein, the composite structure may refer to a carbon-carbon composite structure.

In various embodiments, method 200 may further comprise a step of heating the composite structure to form a ceramic layer (step 230). The composite structure may be heated (e.g., dried or baked) at a temperature in the range from about 500° C. (932° F.) to about 1500° C. (2732° F.). In various embodiments, the composite structure may be heated to a temperature in a range from about 650° C. (1202° F.) to about 1350° C. (2462° F.), or between about 800° C. (1472° F.) to about 1100° C. (2012° F.). In various embodiments, the composite structure may be heated to, or at least to, about 900° C. (1652° F.) (the term "about" in this context means plus or minus 100° C. (212° F.)). Step 230 may, for example, comprise heating the composite structure for a period between about 0.5 hour and about eight hours, or about three hours or about four hours (the term "about" in this context means plus or minus one hour). The temperature rise may be controlled at a rate that removes water without boiling and provides temperature uniformity throughout the composite structure. The pressure during heating of the substrate may be atmospheric pressure, or between 5 pascals and 150,000 pascals, or between 50 and 100,000 pascals, or between 100 and 50,000 pascals.

In various embodiments, step 230 may be performed in an environment comprising an inert gas, such as, for example, nitrogen or argon. During heating the sol is converted to silicon oxycarbide (SiOC). The silicon oxycarbide reacts with the aluminum powder to form aluminum oxide ($Al_2O_3$) (also referred to as alumina) and additional silicon carbide (SiC). The reaction between the aluminum and silicon oxycarbide within the ceramic layer slurry aids in binding the compounds of the ceramic layer slurry and the resulting ceramic layer to itself, thus strengthening the ceramic layer.

In various embodiments, the ceramic layer formed from method 200 may comprise between 0% and 20% by weight alumina, or between 1% and 15% by weight alumina, or about 5% by weight alumina, or about 10% by weight alumina (the term "about" in this context means plus or minus 2 weight percent). In various embodiments, the ceramic layer formed from method 200 may comprise between 10% and 90% by weight silicon carbide, between 50% and 80% by weight silicon carbide, between 65% and 75% by weight silicon carbide, or about 70% by weight silicon carbide (the term "about" in this context means plus or minus 5 weight percent). In various embodiments, the ceramic layer formed from method 200 may comprise between 1% and 50% by weight silicon oxycarbide, between 5% and 40% by weight silicon oxycarbide, between 10% and 30% by weight silicon oxycarbide, or about 20% by weight silicon oxycarbide (the term "about" in this context means plus or minus 5 weight percent).

Figure 2B:
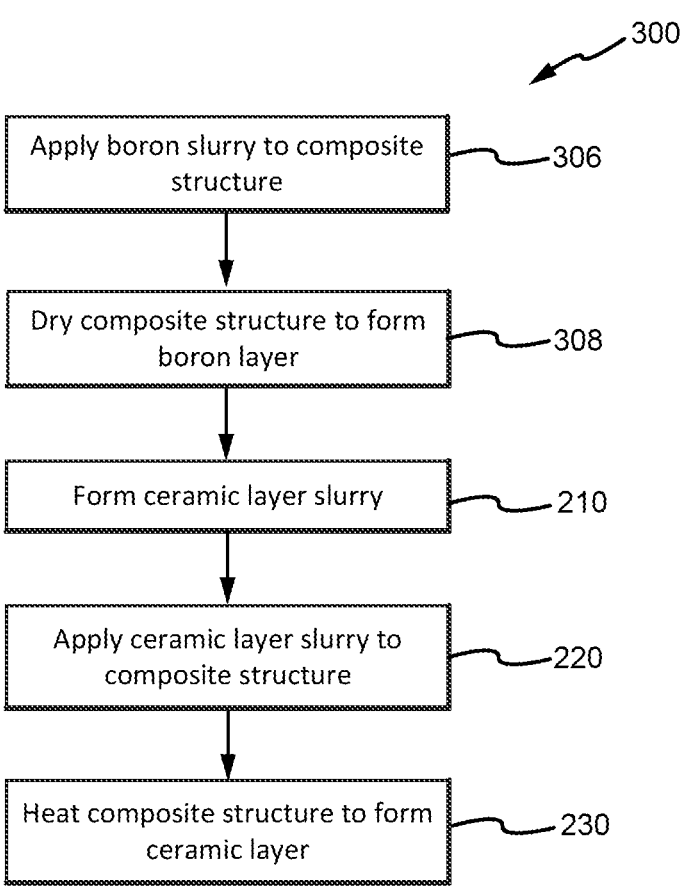

In various embodiments and with reference now to FIG. 2B, a method 300, which comprises steps also found in method 200, may further comprise applying a boron slurry to the composite structure (step 306) prior to applying the ceramic layer slurry. In various embodiments, the boron slurry may comprise a boron compound comprising boron, such as boron, boron carbide, boron nitride, titanium boride, and a carrier fluid (e.g., water, isopropyl alcohol or another alcohol, hexanes, cyclohexane, and/or the like). In embodiments in which the boron compound comprises boron carbide, the boron carbide may comprise a powder comprising granules having sizes ranging from 0.4 micrometer (1.575× $10^{-5}$ inch) to 100 micrometers (3.94×$10^{-3}$ inch) in size. The boron slurry may comprise between 10% and 60% by weight boron compound (e.g., boron carbide), and the remainder comprising solvent and/or carrier fluid. The boron slurry may further comprise a dispersant, which may be any suitable dispersant. For example, the dispersant may comprise aluminum oxide (for example, NanoBYK-3600®, sold by BYK Additives & Instruments). The boron slurry may comprise less than 1% by weight dispersant.

The boron slurry may be applied to the composite structure in step 306 in any suitable manner (spraying, brushing, etc.) and then dried (step 308) to form a boron layer over the composite structure prior to applying the ceramic layer slurry. In various embodiments, step 308 may comprise heating the composite structure to a temperature sufficient to remove the carrier fluid. For example, the composite structure may be heated to a temperature between about 100° C. (212° F.) and 200° C. (392° F.), and further, between 100° C. (212° F.) and 150° C. (302° F.).

In accordance with various embodiments, the ceramic layer slurry may be applied to the boron layer. In response to heating the composite structure to form the ceramic layer (step 230), the boron compound from the boron layer (e.g., boron carbide) may react with the aluminum comprised in the ceramic layer slurry to form aluminum boro-carbide. In various embodiments, the ceramic layer resulting from step 230 may comprise aluminum boro-carbide. In various embodiments, the ceramic layer may at least partially comprise the boron compound layer, or there may be overlap between the ceramic layer and the boron compound layer.

In various embodiments and with reference now to FIG. 2C, a method 400, which comprises steps also found in method 200 and method 300, may further comprise applying a pretreating composition (step 404) prior to applying the ceramic layer slurry (prior to step 220) and/or prior to applying the boron slurry (prior to step 306). Step 404 may, for example, comprise applying a first pretreating composition to an outer surface of a composite structure, such as a component of aircraft wheel braking assembly 10. In various embodiments, the first pretreating composition (pre-treatment layer) comprises an aluminum oxide (e.g., alumina) in water. For example, the aluminum oxide may comprise an additive, such as a nanoparticle dispersion of aluminum oxide (for example, NanoBYK-3600®, sold by BYK Additives & Instruments). The first pretreating composition may further comprise a surfactant or a wetting agent. The composite structure may be porous, allowing the pretreating composition to penetrate at least a portion of the pores of the composite structure.

In various embodiments, after applying the first pretreating composition at step 404, the component may be heated to remove water and fix the aluminum oxide in place (step 408). For example, the component may be heated between about 100° C. (212° F.) and 200° C. (392° F.), and further, between 100° C. (212° F.) and 150° C. (302° F.).

Figure 3A:
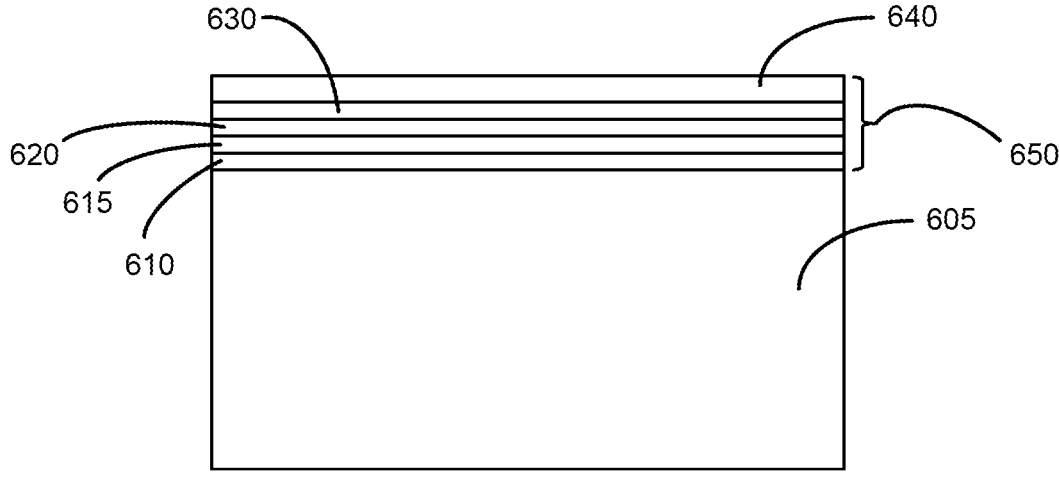
FIG. 3A and FIG. 3B illustrate substrates comprising an oxidation protection system disposed thereon, in accordance with various embodiments.
Figure 3B:
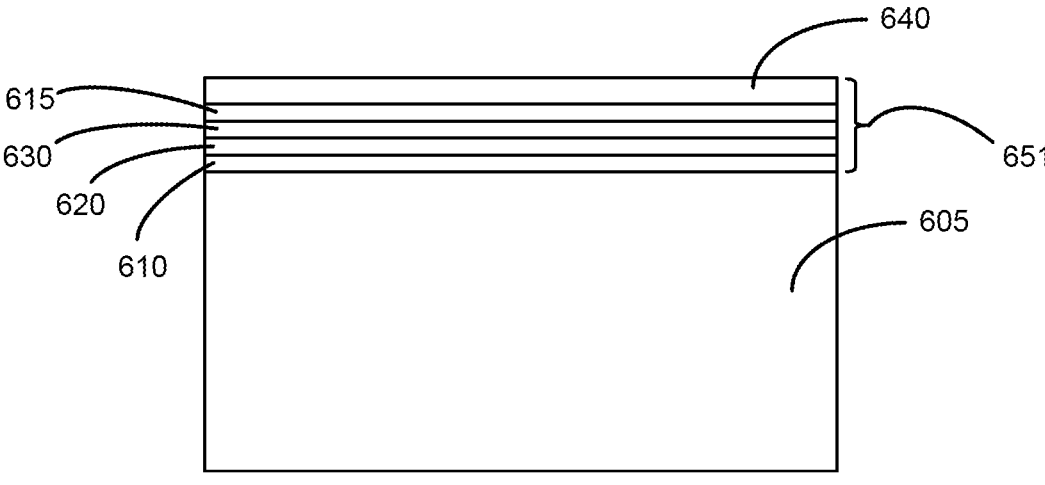

In various embodiments, in addition to the aluminum oxide (alumina) layer applied at step 404, an aluminum phosphate layer (also referred to herein as a second pretreating composition), as discussed herein, may be formed over the alumina layer (e.g., between the alumina layer and the ceramic layer, or between the alumina layer and the boron layer, in accordance with various embodiments) at step 406, as illustrated in FIG. 3A herein. In various embodiments, the aluminum phosphate layer may additionally or alternatively be applied between the ceramic layer (i.e., after steps 210-230) and the glass layer (i.e., before steps 540-550), as illustrated in FIG. 3B herein. In this regard, method 400 may further comprise applying an aluminum phosphate pre-slurry to the composite structure (e.g., over the alumina layer and/or over the ceramic layer) (step 406). In various embodiments, the aluminum phosphate pre-slurry comprises ammonium dihydrogen phosphate ("ADHP") with a carrier fluid (e.g., water). In various embodiments, the aluminum phosphate pre-slurry comprises aluminum orthophosphate with a carrier fluid (e.g., water). In various embodiments, the aluminum phosphate pre-slurry comprises aluminum phosphate with a carrier fluid (e.g., water). In various embodiments, the aluminum phosphate pre-slurry comprises phosphoric acid mixed together with aluminum hydroxide and/or aluminum oxide, with a carrier fluid (e.g., water).

Figure 2D:
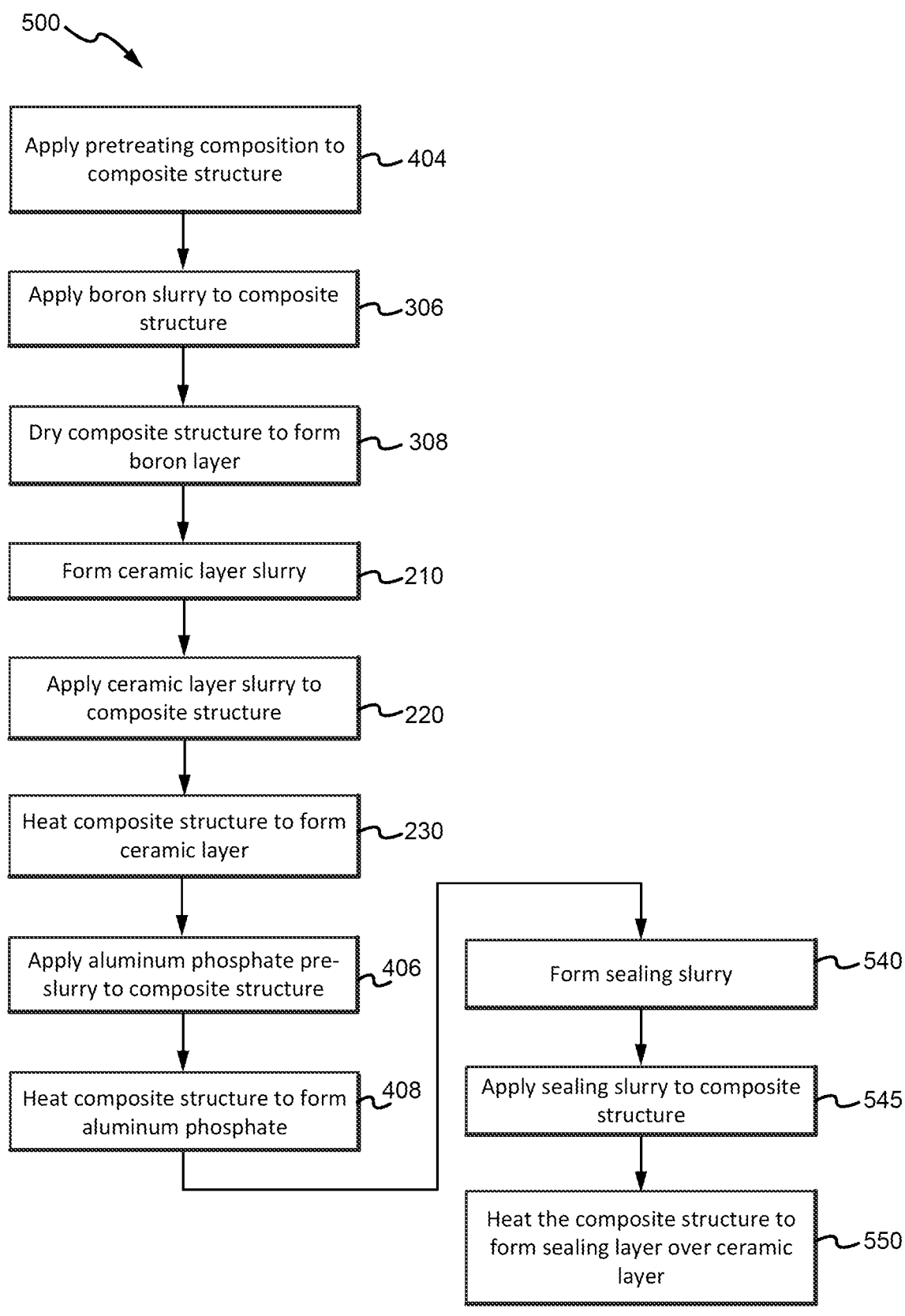

In various embodiments, alumina and aluminum phosphate are applied to the composite structure as a base line, followed by the ceramic layer (i.e., steps 210 through step 230), and then the glass sealing slurry (i.e., steps 540 through step 550 of FIG. 2D). In various embodiments, alumina and aluminum phosphate are applied to the composite structure as a base line, followed by the boron layer (e.g., step 306 and step 308) followed by the ceramic layer (i.e., steps 210 through step 230), and then the glass sealing slurry (i.e., steps 540 through step 550 of FIG. 2D).

In various embodiments, the second pretreating composition may further comprise, for example, a second metal salt such as a magnesium salt. In various embodiments, the aluminum to phosphorus molar ratio of the aluminum phosphate is 1 to 3 or less. Further, the second pretreating composition may also comprise a surfactant or a wetting agent. In various embodiments, the second pretreating composition is applied to the composite structure atop the first pretreating composition.

In various embodiments, after applying the aluminum phosphate pre-slurry, the component may be heated to remove water and fix the aluminum phosphate in place (step 408). For example, the component may be heated between about 600° C. (1112° F.) and about 800° C. (1472° F.), and further, between about 650° C. (1202° F.) and 750° C. (1382° F.).

In various embodiments, method 400 further comprises applying a boron slurry to the composite structure (step 306) prior to applying the ceramic layer slurry, and drying the composite structure (step 308) to form a boron layer over the composite structure (e.g., between the pretreating composition and the ceramic layer), as described above with respect to FIG. 2B.

In various embodiments, method 400 further comprises forming a ceramic layer slurry (step 210), applying the ceramic layer slurry to the composite structure (step 220), and heating the composite structure to form a ceramic layer (step 230), as described above with respect to FIG. 2A.

In various embodiments and with reference now to FIG. 2D, a method 500, which comprises steps also found in method 200, method 300, and method 400, may further comprise a step 540, of forming a sealing slurry by combining a sealing pre-slurry composition, which may comprise a sealing glass composition in glass frit or powder form, with a carrier fluid (such as, for example, water). The sealing slurry may be applied to the composite structure (step 545), for example, by spraying or brushing the sealing slurry on to an outer surface of the ceramic layer. Any suitable manner of applying the sealing slurry to the ceramic layer and/or composite structure is within the scope of the present disclosure (e.g., the application methods described in relation to step 220). In various embodiments, the sealing slurry may be substantially free of boron nitride. In this case, "substantially free" means less than 0.01 percent by weight. In various embodiments, the sealing slurry is applied on top of the ceramic layer (i.e., steps 210 through step 230 are performed before steps 540 through step 550). In various embodiments, the sealing slurry is applied on top of the aluminum phosphate layer (i.e., step 406 and step 408 are performed after steps 210 through step 230 and before steps 540 through step 550). However, as previously mentioned, step 406 and step 408 may alternatively be performed between step 404 and step 306 (see FIG. 2C). In this regard, the sealing slurry may be applied directly on top of the ceramic layer, in accordance with various embodiments.

In various embodiments, the sealing glass composition may comprise phosphate glass in the form of a glass frit, powder, or other suitable pulverized and/or ground form, with a carrier fluid (such as, for example, water). The sealing glass composition may comprise and/or be combined with one or more alkali metal glass modifiers, one or more glass network modifiers and/or one or more additional glass formers. In various embodiments, boron oxide or a precursor may optionally be combined with the $P_2O_5$ mixture to form a borophosphate glass, which has improved self-healing properties at the operating temperatures typically seen in aircraft braking assemblies. In various embodiments, the phosphate glass and/or borophosphate glass may be characterized by the absence of an oxide of silicon. Further, the ratio of $P_2O_5$ to metal oxide in the fused glass may be in the range from about 0.25 to about 5 by weight.

Potential alkali metal glass modifiers may be selected from oxides of lithium, sodium, potassium, rubidium, cesium, and mixtures thereof. In various embodiments, the glass modifier may be an oxide of lithium, sodium, potassium, or mixtures thereof. These or other glass modifiers may function as fluxing agents. Additional glass formers can include oxides of boron, silicon, sulfur, germanium, arsenic, antimony, and mixtures thereof.

Suitable glass network modifiers include oxides of vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof.

The sealing glass composition may be prepared by combining the above ingredients and heating them to a fusion temperature. In various embodiments, depending on the particular combination of elements, the fusion temperature may be in the range from about 700° C. (1292° F.) to about 1500° C. (2732° F.). The resultant melt may then be cooled and pulverized and/or ground to form a glass frit or powder. In various embodiments, the sealing glass composition may be annealed to a rigid, friable state prior to being pulverized. Glass transition temperature ($T_g$), glass softening temperature ($T_s$) and glass melting temperature ($T_m$) may be increased by increasing refinement time and/or temperature. Before fusion, the sealing glass composition comprises from about 20 mol % to about 80 mol % of $P_2O_5$. In various embodiments, the sealing glass composition comprises from about 30 mol % to about 70 mol % $P_2O_5$, or precursor thereof. In various embodiments, the sealing glass composition comprises from about 40 to about 60 mol % of $P_2O_5$. In this context, the term "about" means plus or minus 5 mol %.

The sealing glass composition may comprise, or be combined with, from about 5 mol % to about 50 mol % of the alkali metal oxide. In various embodiments, the sealing glass composition may comprise, or be combined with, from about 10 mol % to about 40 mol % of the alkali metal oxide. Further, the sealing glass composition may comprise, or be combined with, from about 15 to about 30 mol % of the alkali metal oxide or one or more precursors thereof. In various embodiments, the sealing glass composition may comprise, or be combined with, from about 0.5 mol % to about 50 mol % of one or more of the above-indicated glass formers. The sealing glass composition may comprise, or be combined with, about 5 to about 20 mol % of one or more of the above-indicated glass formers. As used herein, mol % is defined as the number of moles of a constituent per the total moles of the solution.

In various embodiments, the sealing glass composition may comprise, or be combined with, from about 0.5 mol % to about 40 mol % of one or more of the above-indicated glass network modifiers. The sealing glass composition may comprise, or be combined with, from about 2.0 mol % to about 25 mol % of one or more of the above-indicated glass network modifiers.

In various embodiments, the sealing glass composition may be represented by the formula:

$$a(A'_2O)_x(P_2O_5)_{y1}b(G_fO)_{y2}c(A''O)_z \qquad [1]$$

In Formula 1, A' is selected from: lithium, sodium, potassium, rubidium, cesium, and mixtures thereof; $G_f$ is selected from: boron, silicon, sulfur, germanium, arsenic, antimony, bismuth, and mixtures thereof; A" is selected from: vanadium, aluminum, tin, titanium, chromium, manganese, iron, cobalt, nickel, copper, mercury, zinc, thulium, lead, zirconium, lanthanum, cerium, praseodymium, neodymium, samarium, europium, gadolinium, terbium, dysprosium, holmium, erbium, thulium, ytterbium, actinium, thorium, uranium, yttrium, gallium, magnesium, calcium, strontium, barium, tin, bismuth, cadmium, and mixtures thereof; a is a number in the range from 1 to about 5; b is a number in the range from 0 to about 10; c is a number in the range from 0 to about 30; x is a number in the range from about 0.050 to about 0.500; $y_1$ is a number in the range from about 0.100 to about 0.950; $y_2$ is a number in the range from 0 to about 0.20; and z is a number in the range from about 0.01 to about 0.5; $(x+y_1+y_2+z)=1$; and $x<(y_1+y_2)$. The sealing glass composition may be formulated to balance the reactivity, durability and flow of the resulting glass base layer for optimal performance. As used in this context, the term "about" means plus or minus ten percent of the respective value.

The sealing slurry may comprise any suitable weight percentage sealing glass composition. For example, the sealing slurry may comprise between 20% and 50% by weight sealing glass composition, between 20% and 40% by weight sealing glass composition, between 20% and 30% by weight sealing glass composition, and/or between 30% and 40% by weight sealing glass composition. The sealing pre-slurry composition (and/or the resulting sealing layer, discussed in association with step 550) may comprise any suitable weight percentage sealing glass composition. For example, the sealing pre-slurry composition may comprise between 50% and 95% by weight sealing glass composition, between 60% and 90% by weight sealing glass composition, and/or between 70% and 80% by weight sealing glass composition.

In various embodiments, method 500 may further comprise a step 550 of heating the composite structure to form a sealing layer comprising glass over the ceramic layer (or over the aluminum phosphate layer in accordance with various embodiments). The composite structure may be heated (e.g., dried or baked) at a temperature in the range from about 200° C. (292° F.) to about 1000° C. (1832° F.). In various embodiments, the composite structure is heated to a temperature in a range from about 600° C. (1112° F.) to about 1000° C. (1832° F.), or between about 200° C. (292° F.) to about 900° C. (1652° F.), or further, between about 400° C. (752° F.) to about 850° C. (1562° F.). Step 550 may, for example, comprise heating the composite structure for a period between about 0.5 hour and about 8 hours, wherein the term "about" in this context only means plus or minus 0.25 hours. The sealing layer may also be referred to as a coating.

In various embodiments, the composite structure may be heated to a first, lower temperature (for example, about 30° C. (86° F.) to about 400° C. (752° F.)) to bake or dry the sealing layer at a controlled depth. A second, higher temperature (for example, about 300° C. (572° F.) to about 1000° C. (1832° F.)) may then be used to melt the glass composition, creating a substantially uniform sealing layer over the ceramic layer. The duration of each heating step can be determined as a fraction of the overall heating time and can range from about 10% to about 50%, wherein the term "about" in this context only means plus or minus 5%. In various embodiments, the duration of the lower temperature heating step(s) can range from about 20% to about 40% of the overall heating time, wherein the term "about" in this context only means plus or minus 5%. The lower temperature step(s) may occupy a larger fraction of the overall heating time, for example, to provide relatively slow heating up to and through the first lower temperature. The exact heating profile will depend on a combination of the first temperature and desired depth of the drying portion.

Step 550 may be performed in an inert environment, such as under a blanket of inert gas or less reactive gas (e.g., nitrogen, argon, other noble gases, and the like). For example, a composite structure may be pretreated or warmed prior to application of the sealing slurry to aid in the penetration of the sealing slurry. Step 250 may be for a period of about 2 hours at a temperature of about 600° C. (1112° F.) to about 900° C. (1652° F.), wherein the term "about" in this context only means plus or minus 50° C. The composite structure and the sealing slurry may then be dried or baked in a non-oxidizing, inert or less reactive atmosphere, e.g., noble gasses and/or nitrogen ($N_2$), to optimize the retention of the sealing pre-slurry composition of the sealing slurry and resulting sealing layer filling any pores or cracks in the ceramic layer. This retention may, for example, be improved by heating the composite structure to about 200° C. (392° F.) and maintaining the temperature for about 1 hour before heating the carbon-carbon composite to a temperature in the range described above. The temperature rise may be controlled at a rate that removes water without boiling and provides temperature uniformity throughout the composite structure.

At elevated operation temperatures of aircraft brake disks (e.g., 760° C. (1400° F.) and above), the ceramic layer may crack, which causes a risk of oxygen penetrating through the oxidation protection system and allowing oxidation of the composite structure. At such elevated temperatures, the sealing layer may melt and/or flow, allowing the sealing layer to fill any cracks that may form in the ceramic layer, thus, sealing the ceramic layer and the oxidation protection system.

In various embodiments, the sealing slurry may comprise an additional metal salt. The cation of the additional metal salt may be multivalent. The metal may be an alkaline earth metal or a transition metal. In various embodiments, the metal may be an alkali metal. The multivalent cation may be derived from a non-metallic element such as boron. The term "metal" is used herein to include multivalent elements such as boron that are technically non-metallic. The metal of the additional metal salt may be an alkaline earth metal such as calcium, magnesium, strontium, barium, or a mixture of two or more thereof. The metal for the additional metal salt may be iron, manganese, tin, zinc, or a mixture of two or more thereof. The anion for the additional metal salt may be an inorganic anion such as a phosphate, halide, sulfate or nitrate, or an organic anion such as acetate. In various embodiments, the additional metal salt may be an alkaline earth metal salt such as an alkaline earth metal phosphate. In various embodiments, the additional metal salt may be a magnesium salt such as magnesium phosphate. In various embodiments, the additional metal salt may be an alkaline earth metal nitrate, an alkaline earth metal halide, an alkaline earth metal sulfate, an alkaline earth metal acetate, or a mixture of two or more thereof. In various embodiments, the additional metal salt may be magnesium nitrate, magnesium halide, magnesium sulfate, or a mixture of two or more thereof. In various embodiments, the additional metal salt may comprise: (i) magnesium phosphate; and (ii) a magnesium nitrate, magnesium halide, magnesium sulfate, or a mixture of two or more thereof.

The additional metal salt may be selected with reference to its compatibility with other ingredients in the sealing slurry. Compatibility may include metal phosphates that do not precipitate, flocculate, agglomerate, react to form undesirable species, or settle out prior to application of the sealing slurry to the carbon-carbon composite. The phosphates may be monobasic ($H_2PO_4^-$), dibasic ($HPO_4^{-2}$), or tribasic ($PO_4^{-3}$). The phosphates may be hydrated. Examples of alkaline earth metal phosphates that may be used include calcium hydrogen phosphate (calcium phosphate, dibasic), calcium phosphate tribasic octahydrate, magnesium hydrogen phosphate (magnesium phosphate, dibasic), magnesium phosphate tribasic octahydrate, strontium hydrogen phosphate (strontium phosphate, dibasic), strontium phosphate tribasic octahydrate and barium phosphate.

In one embodiment, a chemical equivalent of the additional metal salt may be used as the additional metal salt. Chemical equivalents include compounds that yield an equivalent (in this instance, an equivalent of the additional metal salt) in response to an outside stimulus such as, temperature, hydration, or dehydration. For example, equivalents of alkaline earth metal phosphates may include alkaline earth metal pyrophosphates, hypophosphates, hypophosphites and orthophosphites. Equivalent compounds include magnesium and barium pyrophosphate, magnesium and barium orthophosphate, magnesium and barium hypophosphate, magnesium and barium hypophosphite, and magnesium and barium orthophosphite.

While not wishing to be bound by theory, it is believed that the addition of multivalent cations, such as alkaline earth metals, transition metals and nonmetallic elements such as boron, to the sealing slurry enhances the hydrolytic stability of the metal-phosphate network. In general, the hydrolytic stability of the metal-phosphate network increases as the metal content increases, however a change from one metallic element to another may influence oxidation inhibition to a greater extent than a variation in the metal-phosphate ratio. The solubility of the phosphate compounds may be influenced by the nature of the cation associated with the phosphate anion. For example, phosphates incorporating monovalent cations such as sodium orthophosphate or phosphoric acid (hydrogen cations) are very soluble in water, while (tri)barium orthophosphate is insoluble. Phosphoric acids can be condensed to form networks but such compounds tend to remain hydrolytically unstable. Generally, it is believed that the multivalent cations link phosphate anions creating a phosphate network with reduced solubility. Another factor that may influence hydrolytic stability is the presence of —P—O—H groups in the condensed phosphate product formed from the sealing slurry during thermal treatment. The sealing slurry may be formulated to minimize concentration of these species and any subsequent hydrolytic instability. Whereas increasing the metal content may enhance the hydrolytic stability of the sealing slurry, it may be desirable to strike a balance between composition stability and effectiveness as an oxidation inhibitor.

In various embodiments, the additional metal salt may be present in the sealing slurry at a concentration in the range from about 0.5 weight percent to about 30 weight percent, and in various embodiments from about 0.5 weight percent to about 25 weight percent, and in various embodiments from about 5 weight percent to about 20 weight percent. In various embodiments, a combination of two or more additional metal salts may be present at a concentration in the range from about 10 weight percent to about 30 weight percent, and in various embodiments from about 12 weight percent to about 20 weight percent.

FIG. 3A depicts a substrate 605 (e.g., a composite structure) with an oxidation protection system 650 disposed thereon (e.g., on a non-wear or non-friction surface). In accordance with various embodiments, the oxidation protection system 650 may comprise a ceramic layer 630. In various embodiments, ceramic layer 630 is formed as discussed with respect to steps 210-230 of FIG. 2A through FIG. 2D herein. In various embodiments, oxidation protection system 650 may comprise one or more layer(s) between the substrate 605 and the ceramic layer 630, for example, a first pretreatment layer 610, a second pretreatment layer 615, and/or a boron (e.g., boron carbide) layer 620, as discussed herein. Pretreatment layer 610 may be an alumina layer as discussed with respect to step 404 of FIG. 2C and FIG. 2D herein. Pretreatment layer 615 may be an aluminum phosphate layer as discussed with respect to step 406 and step 408 of FIG. 2C. Boron layer 620 may be formed as discussed with respect to step 306 and step 308 of FIG. 2B, FIG. 2C, and FIG. 2D herein. In various embodiments, phosphate layer 615 is disposed between the first pretreatment layer 610 and the boron layer 620, though boron layer 620 may be omitted and the phosphate layer 615 may be between and in direct contact with the pretreatment layer 610 and the ceramic layer 630. In various embodiments, oxidation protection system 650 may comprise a sealing layer 640. Sealing layer 640 may be a glass sealing layer as discussed with respect to steps 540-550 of FIG. 2D herein. In various embodiments, the sealing layer 640 may be disposed on, and directly contact, the ceramic layer 630, such that the ceramic layer 630 is disposed between the sealing layer 640 and the substrate 605. However, as shown in FIG. 3B, the sealing layer 640 may be disposed on, and directly contact, the aluminum phosphate layer 615.

With reference to FIG. 3B, a substrate 605 (e.g., a composite structure) is illustrated with an oxidation protection system 651 disposed thereon (e.g., on a non-wear or non-friction surface). Oxidation protection system 651 may be similar to oxidation protection system 650, except that the second pretreatment layer 615 (e.g., aluminum phosphate) of oxidation protection system 651 is disposed between ceramic layer 630 and sealing layer 640. In various embodiments, first pretreatment layer 610 is disposed between the substrate 605 and the boron layer 620, though boron layer 620 may be omitted and the first pretreatment layer 610 may be between and in direct contact with the ceramic layer 630.

TABLE 1 illustrates an exemplary sealing slurry prepared in accordance with the embodiments discussed herein. Each numerical value in TABLE 1 is the number of grams of the particular substance added to the slurry.

TABLE 1

| | Example >> | |
|---|---|---|
| Sealing Pre- | Glass frit | 34 |
| Slurry Composition (Slurry A) | Aluminum orthophosphate (o-AlPO$_4$) | 2.27 |
| Aluminum Phosphate Pre- | H$_2$O | 52.4 |
| Slurry Composition (Slurry B) | Ammonium dihydrogen phosphate (ADHP) | 11.33 |

As illustrated in TABLE 1, an oxidation protection system sealing slurry (slurry A) comprises a pre-slurry composition, comprising glass frit and various additives such as aluminum orthophosphate in a carrier fluid (i.e., water), was prepared. As illustrated in TABLE 1, an oxidation protection system aluminum phosphate slurry (slurry B) comprises ammonium dihydrogen phosphate in a carrier fluid. Slurry A may be a suitable sealing slurry which will serve as a sealing layer after heating (such as during step 550). In various embodiments, Slurry A may be substantially free of boron nitride. In this case, "substantially free" means less than 0.01 percent by weight.

Figure 4:
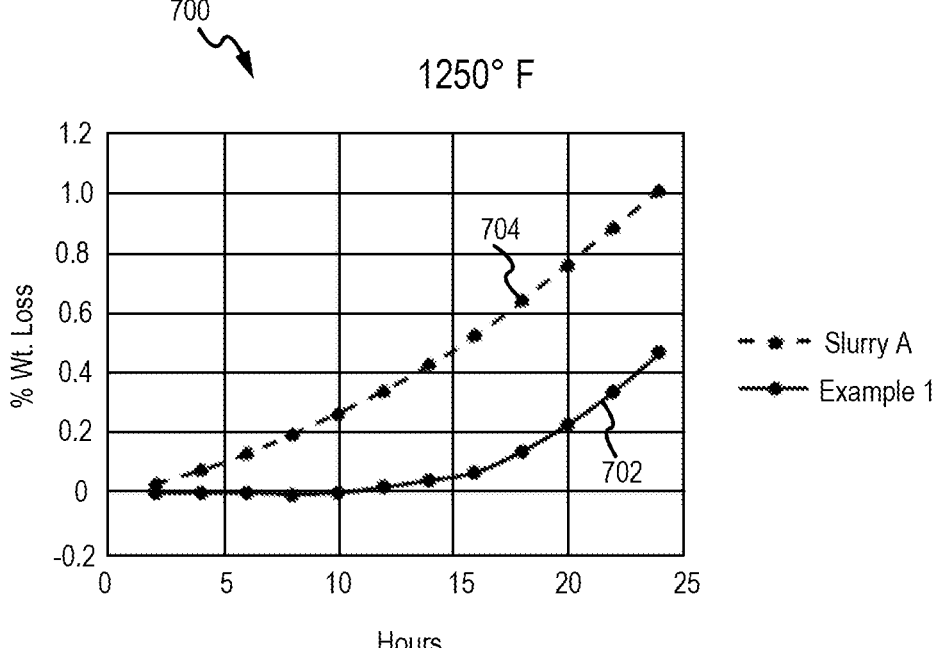
FIG. 4 illustrates experimental data obtained from testing oxidation protection systems, in accordance with various embodiments.

With combined reference to TABLE 1 and FIG. 4, plot 700 in FIG. 4 may allow evaluation of oxidation protection systems comprising a ceramic layer and a sealing layer versus oxidation protection systems comprising a sealing layer without a ceramic layer. Data set 702 represents an oxidation protection system comprising a ceramic layer and a sealing layer, while data set 704 represents an oxidation protection system comprising a sealing layer (resulting from slurry A) without a ceramic layer. Percent weight loss is shown on the y-axis and exposure time is shown on the x-axis of the graph depicted in FIG. 4.

The oxidation protection system represented by data set 704 was prepared by applying slurry A to carbon-carbon composite coupons and heated to form a sealing slurry, in accordance with embodiments discussed herein. Slurry A for data set 704 is not hydrated (i.e., dry). Example 1, represented by data set 702, was prepared by: (1) applying a boron slurry comprising 14 grams of boron carbide, 86 grams of water, and 0.2 grams of dispersant to a carbon-carbon composite coupon, by dipping the coupon in the boron compound slurry; (2) air-drying the boron compound slurry to form a boron layer on the coupon; (3) preparing a ceramic layer slurry comprising 17.02 grams of MTMS, 49.53 grams of water, 30.06 grams of 0.7 μm silicon carbide powder, and 3.10 grams of 3-5-micron aluminum powder; (4) applying the ceramic layer slurry to the boron layer by dipping the coupon in the ceramic layer slurry; (5) air-drying the ceramic layer slurry; (6) heating the coupon at 950° C. (1742° F.) for about one hour under an environment comprising nitrogen gas to form the ceramic layer; (7) applying slurry A to the ceramic layer; and (8) heating the coupon at 870° C. (1598° F.) to melt the glass in the sealing slurry and form the sealing layer. The coupons were then heated in accordance with the time shown on the x-axis and at 1250° F.

As can be seen in FIG. 4, the oxidation protection system having the ceramic layer and the sealing layer (data set 702) resulted in drastically less weight loss of the composite structure than the oxidation protection systems having a sealing layer with no ceramic layer (data set 704). That is, the oxidation protection system having the ceramic layer and the sealing layer (data set 702) resulted in about 0.5% weight loss of the substrate at 1250° F. (677° C.) at the end of the test, while the oxidation protection system having a sealing layer with no ceramic layer (data set 704) resulted in about 1% weight loss. Thus, oxidation protection systems having the ceramic layer and the sealing layer (data set 702) provided significantly greater oxidation protection than the oxidation protection system having the sealing layer only (data set 704). The results tend to indicate that the oxidation protection systems comprising the ceramic layer (comprising alumina, silicon carbide, silicon oxycarbide, and/or aluminum boron carbide), along with the sealing layer disposed thereon, creates a strong barrier which stops oxygen from passing therethrough and causing oxidation of the underlying substrate (especially at elevated temperatures of 1250° F.). The economical preparation and application of the involved slurries along with the positive and improved oxidation protection results, indicate that the systems and methods discussed herein provide effective oxidation protection, in accordance with various embodiments.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An oxidation protection system disposed on an outer surface of a substrate, the oxidation protection system comprising:

a ceramic layer comprising between 1% and 20% by weight alumina, between 50% and 80% silicon carbide, and between 10% and 30% by weight silicon oxycarbide; and a sealing layer comprising a sealing glass composition located over the ceramic layer.

2. The oxidation protection system of claim 1, further comprising a boron layer formed between the ceramic layer and the substrate.

3. The oxidation protection system of claim 2, wherein the ceramic layer comprises about 5% by weight alumina, about 75% by weight silicon carbide and about 20% by weight silicon oxycarbide.

4. An aircraft brake disk, comprising:

a carbon-carbon composite structure comprising a non-friction surface; and an oxidation protection system disposed on the non-friction surface, the oxidation protection system including:

a ceramic layer comprising between 1% and 20% by weight alumina, between 50% and 80% silicon carbide, and between 10% and 30% by weight silicon oxycarbide; and a sealing layer comprising a sealing glass composition located over the ceramic layer.

5. The aircraft brake disk of claim 4, wherein the oxidation protection system further comprising a boron layer formed between the ceramic layer and the non-friction surface.

* * * * *